US012039226B1

(12) United States Patent
Branch

(10) Patent No.: US 12,039,226 B1
(45) Date of Patent: Jul. 16, 2024

(54) TIME REVERSAL ACOUSTICS METHOD AND APPARATUS FOR DETECTING CHANGES IN ENVIRONMENTS

(71) Applicant: National Technology & Engineering Solutions of Sandia, LLC, Albuquerque, NM (US)

(72) Inventor: Darren W. Branch, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 139 days.

(21) Appl. No.: 17/741,629

(22) Filed: May 11, 2022

(51) Int. Cl.
*G06F 3/16* (2006.01)
*H04S 7/00* (2006.01)

(52) U.S. Cl.
CPC .............. *G06F 3/165* (2013.01); *H04S 7/301* (2013.01)

(58) Field of Classification Search
CPC ....... G06F 3/16; G06F 3/165; G08B 13/2462; G08B 29/26; G08B 21/0261; G01S 15/87; G01S 15/74; G01S 5/18; G01S 15/523; G01S 15/04; G01S 15/876; G01S 15/878; H04S 7/301
USPC .......................................................... 700/94
See application file for complete search history.

(56) References Cited

U.S. PATENT DOCUMENTS

| 8,649,875 B2 | 2/2014 | Sarvazyan |
| 8,649,876 B2 | 2/2014 | Sarvazyan |
| 8,717,574 B2 | 5/2014 | Yang et al. |
| 2005/0146433 A1* | 7/2005 | Waltermann ............ G01S 15/74 340/553 |
| 2009/0083004 A1* | 3/2009 | Ihn ..................... G01N 29/4472 702/189 |
| 2012/0000289 A1* | 1/2012 | Tsurugaya ............ G01S 15/101 73/632 |
| 2016/0154089 A1* | 6/2016 | Altman .................. G08B 29/26 367/124 |
| 2019/0247078 A1 | 8/2019 | Sinelnikov |

* cited by examiner

*Primary Examiner* — Yogeshkumar Patel
(74) *Attorney, Agent, or Firm* — Calfee, Halter & Griswold, LLP; Samantha Updegraff

(57) ABSTRACT

A method for detecting a change in an environment is disclosed. The method includes forming a test acoustic signal based on time-reversal of a baseline acoustic signal after the baseline acoustic signal has traversed the environment while the environment is in a baseline condition. The method also includes detecting the test acoustic signal after the test acoustic signal has traversed the environment while the environment is in an unknown condition. The method includes determining whether there has been a change in the environment by comparing the baseline acoustic signal with the detected test acoustic signal after the test acoustic signal has traversed the environment while the environment is in the unknown condition.

18 Claims, 29 Drawing Sheets

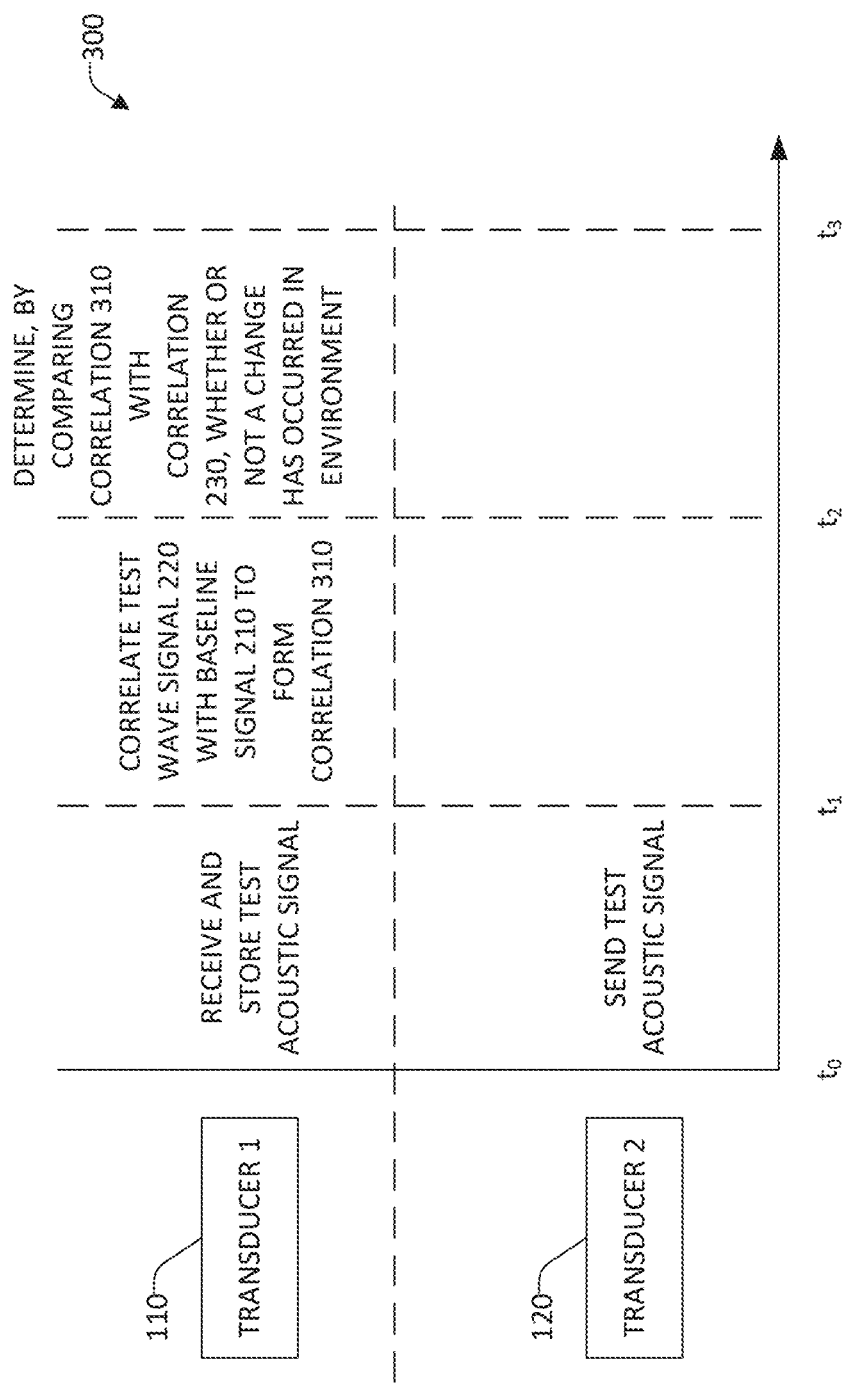

TIME REVERSAL ACOUSTICS METHOD AND APPARATUS FOR DETECTING CHANGES IN ENVIRONMENTS

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

FIELD

The concepts presented herein relate to applications of time reversal acoustics. More specifically, this disclosure relates to using time reversal acoustics to identify changes in areas, systems, objects, devices, and other subjects of interest where monitoring changes is desired.

BACKGROUND

Security systems that detect changes in environments, objects, and other subjects of interest are useful for a variety of purposes and applications. Examples of security systems include systems that detect changes or tampering in storage facilities for top secret materials (e.g., documents and/or digital media), storage sites for hazardous materials (e.g., chemical, biological, radiological, and/or nuclear weapons or radioactive waste), vaults for storing precious or valuable items, etc.

Technologies that detect unauthorized access and/or can verify the integrity of monitored items are often deployed on an individual basis. Examples of such technologies include loop seals (which are often placed on spent fuel container lids) and optical surveillance cameras. Many of these technologies have limitations, particularly in terms of limited use, circumvention, and data acquisition and analysis. Optical surveillance cameras, for example, are often limited in terms of their ability to monitor large areas and are subject to obstruction, deliberate or otherwise. Data from even one optical camera can be burdensome to review, as a video from an optical camera may include hours or days of footage. Multiple optical cameras are typically necessary to monitor large or circuitous spaces. Coordinating data from multiple cameras is difficult and adds to the already high burden of data analysis. Moreover, increasing the number of target items in the monitored space increases the difficulty to monitor such target items by way of optical cameras. For example, tight geometric placement of spent nuclear fuel containers, spent fuel pools, geological repositories, etc., makes monitoring individual items difficult.

For at least the above reasons, new tamper or breach indicating technologies and approaches are needed to increase monitoring effectiveness. One example of a new technique in development uses optical monitoring to scan broader volumes or areas (e.g., an optical system that is configured to scan whole storage spaces or warehouse areas, rather than focusing on individual storage tanks, etc.). However, this technique is subject to the data acquisition and processing limitations described above with respect to conventional optical systems.

SUMMARY

The following is a brief summary of subject matter that is described in greater detail herein. This summary is not intended to be limiting as to the scope of the claims.

Described herein is a method for detecting a change in an environment. The method includes forming a test acoustic signal based on time-reversal of a baseline acoustic signal after the baseline acoustic signal has traversed the environment while the environment is in a baseline condition. The method also includes detecting the test acoustic signal after the test acoustic signal has traversed the environment while the environment is in an unknown condition. The method additionally includes determining that there has been a change in the environment by comparing the baseline acoustic signal with the detected test acoustic signal after the test acoustic signal has traversed the environment while the environment is in the unknown condition. The method further includes outputting an indication that there has been a change in the environment upon determining that there has been a change in the environment.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF DRAWINGS

FIG. 3 shows a timeline of an exemplary testing measurement 300 that can be performed after, and respect to, baseline measurement 200.

DETAILED DESCRIPTION

Figure 1A:
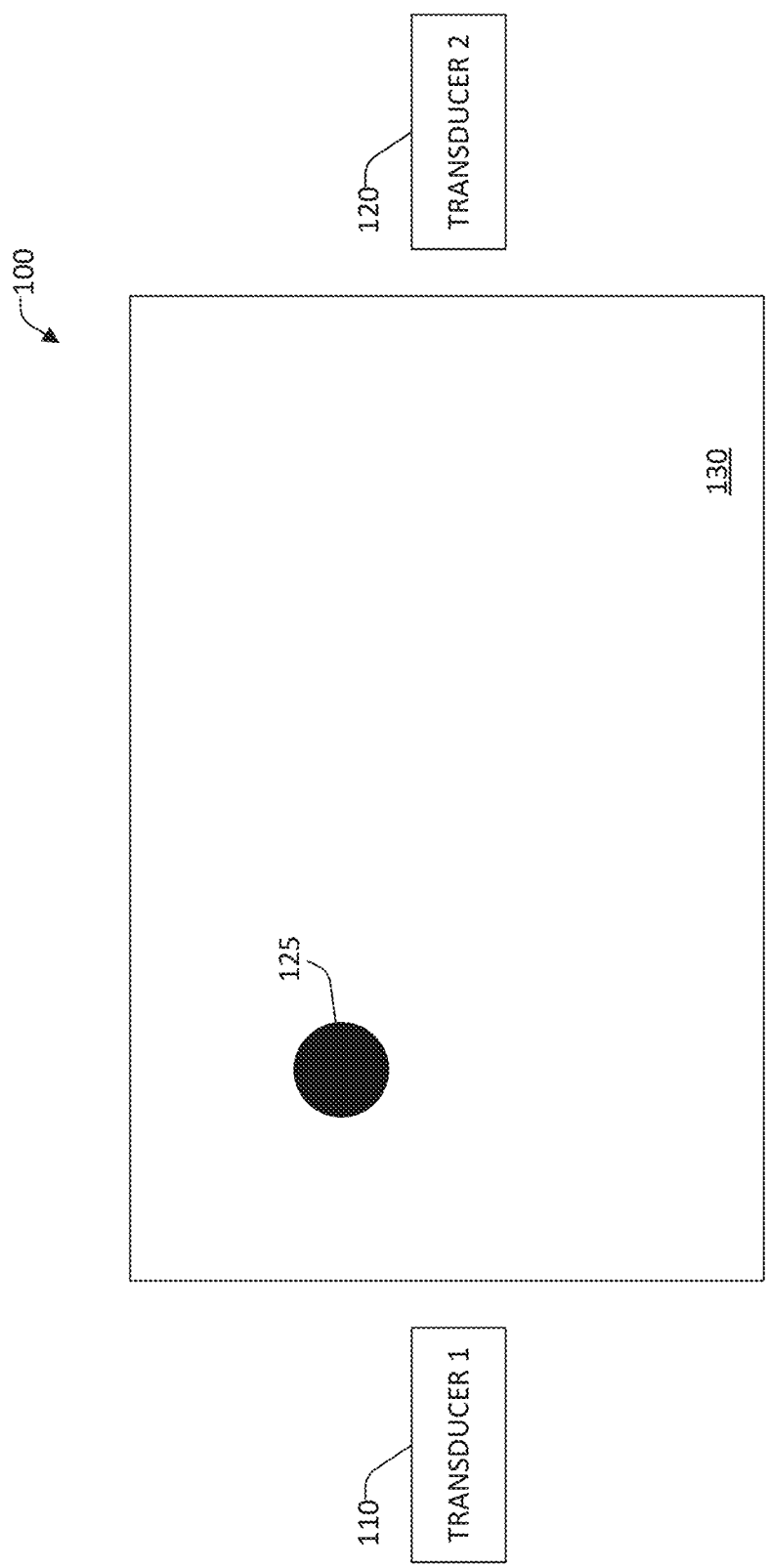
FIG. 1A is a schematic illustrating an exemplary setup 100 for using time reversal acoustics (TRA) to non-invasively monitor an environment of interest.

Several illustrative embodiments will be described in detail with the understanding that the present disclosure merely exemplifies the general inventive concepts. Embodiments encompassing the general inventive concepts may take various forms and the general inventive concepts are not intended to be limited to the specific embodiments described herein.

Overview of the Disclosed Systems and Methods

The present disclosure proposes novel systems and methods that employ time reversal acoustics (TRA) to noninvasively monitor subjects of interest. TRA refers to propagation of conjugate acoustic signals that interact with structural features of an environment to indicate a tamper or other unwanted/unauthorized event. Accordingly, an alteration in the environment (such as a change in the structural features of an object in the environment or a change in a position of the object in the environment) can be detected in less time and higher accuracy than conventional approaches, such as color-indicating reactions, optical scanning, loop seals, pressure adhesives, unique markings, and alarms. TRA is not limited to subjects of interest having standard shapes and sizes, unlike certain conventional approaches just mentioned.

Briefly B described, aspects relating to use of TRA in connection with detecting a change to an environment between a first time and a second time are presented. In an example, an environment that is to be monitored for change includes a first transducer and a second transducer. At a first time, a first processing apparatus in communication with the first transducer provides a first electrical signal to the first transducer, and the first transducer emits a first acoustic signal into the environment based upon the first electrical signal. In addition, the first electrical signal (in analog or digital format) is stored in computer-readable storage. In an example, the first electrical signal is a pulse. In another example, the first electrical signal is a sequence of pulses. It is to be understood, however, that the first electrical signal may be of any suitable form. The first acoustic signal interacts with the environment (and object(s) that may be included in the environment), and the second transducer detects the first acoustic signal subsequent to the first acoustic signal interacting with the environment (e.g., reflecting off of features in the environment, propagating through features in the environment, etc.). The second transducer generates a second electrical signal based upon the detected first acoustic signal, and a second processing apparatus in communication with the second transducer reverses the second electrical signal in time (thereby forming a third electrical signal). Thus, the beginning of the third electrical signal is the end of the second electrical signal, and the end of the third electrical signal is the beginning of the second electrical signal. The second processing apparatus stores the third electrical signal (in analog or digital format) in computer-readable storage. The first electrical signal and the third electrical signal, in combination, are a signature for the state of the environment at the first time.

Subsequent to the first time and at a second time when it is desired to ascertain whether there have been any changes in the environment (e.g., the object has been removed, the object has been moved, the object has been physically modified, etc.), the second processing apparatus provides the second transducer with the third electrical signal, and the second transducer emits a second acoustic signal into the environment based upon the third electrical signal. Optionally, the second processing apparatus amplifies the third electrical signal prior to providing the third electrical signal to the second transducer. The first transducer detects the second acoustic signal subsequent to the second acoustic signal interacting with the environment and generates a fourth electrical signal based upon the detected second acoustic signal. The first processing apparatus stores the fourth electrical signal in the computer-readable storage and performs a comparison and/or correlation between the first electrical signal and the fourth electrical signal. The first processing apparatus makes a determination as to whether there has been a change in the environment based upon the comparison and/or correlation between the first electrical signal and the fourth electrical signal.

With more specificity, when the first electrical signal and the fourth electrical signal are substantially equivalent (or when there is a relatively high correlation between such signals), then the first processing apparatus can output an indication that there has been no change in the environment between the first time and the second time. When the first electrical signal and the fourth electrical signal are not substantially equivalent (or when there is a relatively low correlation between such signals), then the first processing apparatus can output an indication that there has been a change to the environment between the first time and the second time. As will be described herein, the first processing apparatus can compute a correlation value between the first electrical signal and the fourth electrical signal, and the first processing apparatus can determine whether the first electrical signal and the fourth electrical signal have sufficiently high correlation based upon the correlation value (e.g., the first processing apparatus can determine that the first electrical signal and the fourth electrical signal are highly correlated when the correlation value is above a threshold, or can determine that the first electrical signal and the fourth electrical signal are not highly correlated when the correlation value is below a threshold). The second transducer can emit acoustic signals based upon the third electrical signal from time to time, whenever it is desirable to ascertain whether there has been an alteration in the environment.

The first transducer and second transducer are at fixed positions and orientations in the environment, such that the first transducer and the second transducer have the same positions and orientations at the first time and the second time. Additionally, various signal processing techniques can be employed to, for example, filter noise included in at least the second and fourth electrical signals. Moreover, while the transducers have been described as unitary devices that can both emit acoustic signals and detect acoustic signals, it is to be understood that a transducer can be a microphone-speaker pair that are placed in close proximity to one another.

In another embodiment, rather than detecting an alteration in an environment through comparison of the first electrical signal and the fourth electrical signal, an alteration in the environment can be detected based upon a comparison between a first time-reversed signal detected by the first transducer when the environment is in a known (baseline state) and a second time-reversed signal detected by the first transducer when the environment is in an unknown state. More specifically, at a first time, when the environment is in the baseline state, the first transducer, the first processing apparatus, the second transducer, and the second processing apparatus can operate as described above, such that the fourth electrical signal is stored in the computer-readable storage.

At a second time that is subsequent the first time, the process is at least partially repeated; more specifically, at the second time, the second transducer re-emits the second acoustic signal back into the environment (based upon the third electrical signal, which can be stored in computer-readable storage of the second processing apparatus). The first transducer detects the second acoustic signal after it has interacted with the environment, and the first processing apparatus generates a fifth electrical signal based upon the detected second acoustic signal. The first processing apparatus determines whether the environment has changed between the first time and the second time based upon the fourth electrical signal and the fifth electrical signal (e.g., based upon an amount of correlation between the fourth electrical signal and the fifth electrical signal). Put differently, the first processing apparatus determines whether the environment has changed based upon two detections of the time-reversed signal at two different times: 1) a first time when the environment is in a known (unaltered) state; and 2) a second time that is after the first time.

Furthermore, while the description above notes that a first transducer and a second transducer can be employed to detect an alteration in an environment, it is to be understood that several additional transducers can be used and positioned at various positions in the environment. For example, a third transducer can detect the first acoustic signal emitted by the first transducer, generate a fifth electrical signal based upon the first acoustic signal, and time reverse the fifth electrical signal to generate a sixth electrical signal. When it is desired to determine whether there has been a change in the environment, the third transducer can emit a third acoustic signal based upon the sixth electrical signal (where the third acoustic signal is effectively a time-reversal of the first acoustic signal as detected by the third transducer). The first transducer detects the third acoustic signal, generates a seventh electrical signal (that represents the third acoustic signal), and then performs a correlation between the seventh electrical signal and the first electrical signal. From the foregoing, it can be ascertained that multiple transducers can generate acoustic signals that are to be time-reversed, and multiple transducers can generate time-reversed acoustic signals.

The acoustic signals can be of any suitable acoustic frequency, such as sonic frequencies, ultrasonic frequencies, infrasonic frequencies, and/or subsonic frequencies. Further, timing protocols can be put in place to cause transducers to emit acoustic signals at appropriate times, either to purposefully cause interference or to avoid interference. Such aspects are described in greater detail with reference to the drawings.

Moreover, while the first transducer and the second transducer were described as being communicatively coupled to a first processing apparatus and a second processing apparatus, respectively, it is to be understood that a single processing apparatus can perform the functions described above as being performed by two processing apparatuses.

FIG. 1A is a schematic that illustrates an exemplary setup 100 for TRA monitoring of an environment 130 of interest. In particular, FIG. 1A shows two transducers 110 and 120 on either side of the environment of interest 130. Both transducers 110 and 120 may act as acoustic signal emitters. Transducers 110 and 120 may also operate as acoustic signal receivers.

Transducers 110 and 120 may emit and receive acoustic signals at any suitable frequency (e.g., sonic frequencies, ultrasonic frequencies, infrasonic frequencies, and/or subsonic frequencies). In certain applications, it may be useful, for example, to choose transducers that emit/receive acoustic signals at frequencies outside of the range of ambient noise. This can avoid confounding the TRA signals with ambient signals. In underwater applications, transducers that emit and detect frequencies of between 10 Hz and 1 MHz may be advantageous. In general, however, the techniques and methods described herein can, in principle, be used with transducers that emit and detect signals at any suitable frequency.

Although not explicitly shown in FIG. 1A, both transducers 110 and 120 may be connected to power sources and analytical equipment for driving the acoustic signals and analyzing received signals, respectively. This analytical equipment may include processors, including application specific processors, as well as more standard, multi-purpose computing technology. The analytical equipment may include memory and storage devices (e.g., hard drives, flash drives, memory, and other types of computer-readable storage). Example electronics and memory will be discussed in more detail below.

Note that the use of two transducers here is merely exemplary. As discussed in more detail below, the technologies described herein can employ any suitable number of transducers. In fact, using more transducers may improve properties of the measurement. The improved properties may include spatial resolution and overall signal strengths, among others. Multiple transducers can be used to spatially locate the source of the change to the environment (e.g., the location of a breach), etc. However, it should also be noted that this technique can work with as few as two transducers.

FIG. 1A also shows an object 125, which may or may not be of interest, within environment of interest 130. Guaranteeing security of object 125 may be the purpose for monitoring setup 100. Examples of objects that may be included in the environment of interest 130 include canisters of radioactive waste, sensitive documents, valuable objects (e.g., currency or precious metals), weapons, etc. Object 125 may be any object that a user, enterprise, government, etc. wants to monitor. It may be any object the user, enterprise, government, etc. wants to prevent tampering of or compromising.

Figure 1B:
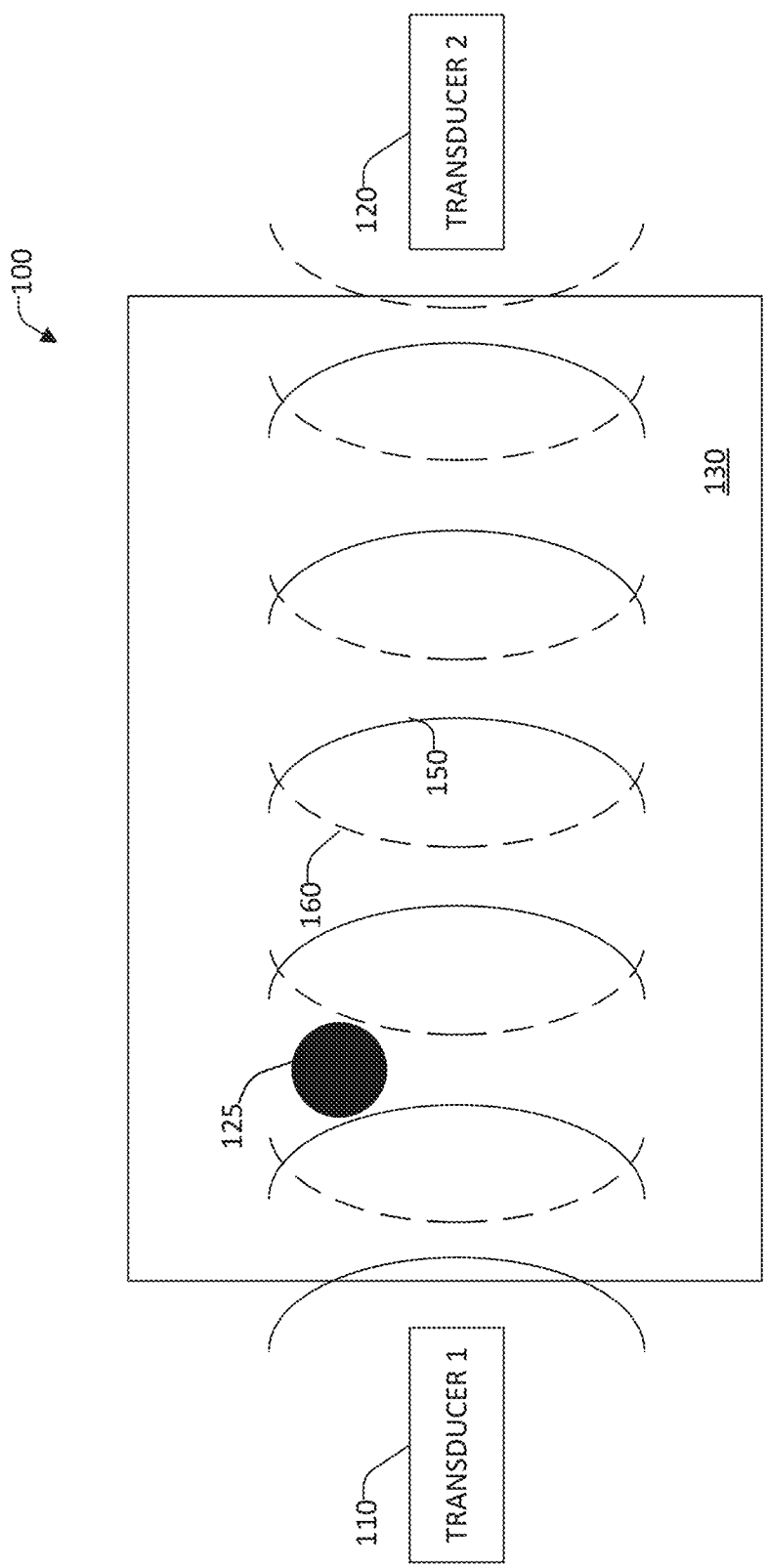
FIG. 1B is a schematic showing acoustic signals emitted and received by transducers in the setup shown in FIG. 1A.

FIG. 1B shows emission of two acoustic signals 150 and 160 into environment of interest 130 by transducers 110 and 120, respectively. The configuration in FIG. 1B is meant only to be a schematic of signal interaction, not a realistic depiction of signals 150 and 160. In particular, though not shown in FIG. 1B, signals 150 and 160 typically interact with and are changed by object 125. The details of these interactions and how they can be exploited in TRA are explained in more detail below.

FIG. 1B shows signal 150 being emitted by transducer 110 and received and analyzed by transducer 120. Similarly, signal 160 is emitted by transducer 120 and received and analyzed by transducer 110. Both acoustic signals 150 and 160 will interact with environment 130 and object 125 before being received by their respective transducers. Therefore, for example, when transducer 110 receives and analyzes signal 160, signal 160 will have been changed from its form at source transducer 120 by its interaction with object 125. The same is true of signal 150 when received and analyzed by transducer 120.

Baseline Measurement

To detect changes in environment of interest 130, first a baseline can be established and stored for later use in interpreting changes, breaches, or tampering, etc. The baseline measurement stores the acoustic parameters of the environment of interest 130 as measured by transducers 110 and 120 in the known, "baseline" configuration. Any changes to these stored acoustic parameters may be interpreted as changes in environment of interest 130, to object 125, or both. Baseline measurements can be established and/or updated as frequently as needed. For example, a baseline measurement may be updated after a known visit to environment 130 by an outside entity has occurred (e.g., routine or scheduled maintenance) and made authorized changes to environment 130. In that case, a new baseline can be established in order to detect further unknown and/or unauthorized changes to environment 130. The new baseline would incorporate the authorized changes so they are not mistakenly interpreted as a breach.

Note in the description below, the baseline is established with transducer 120 as providing the test signal and transducer 110 as providing the original baseline acoustic signal. This is merely for convenience. It is to be understood that the roles of the transducers in setup 100 are interchangeable. Nor does their function and role need be static. The role of each transducer 110 and 120 can change over time. However, once a baseline is established with a particular transducer providing the baseline signal, it is advantageous not to change the transducer roles until a new baseline is established.

Figure 2:
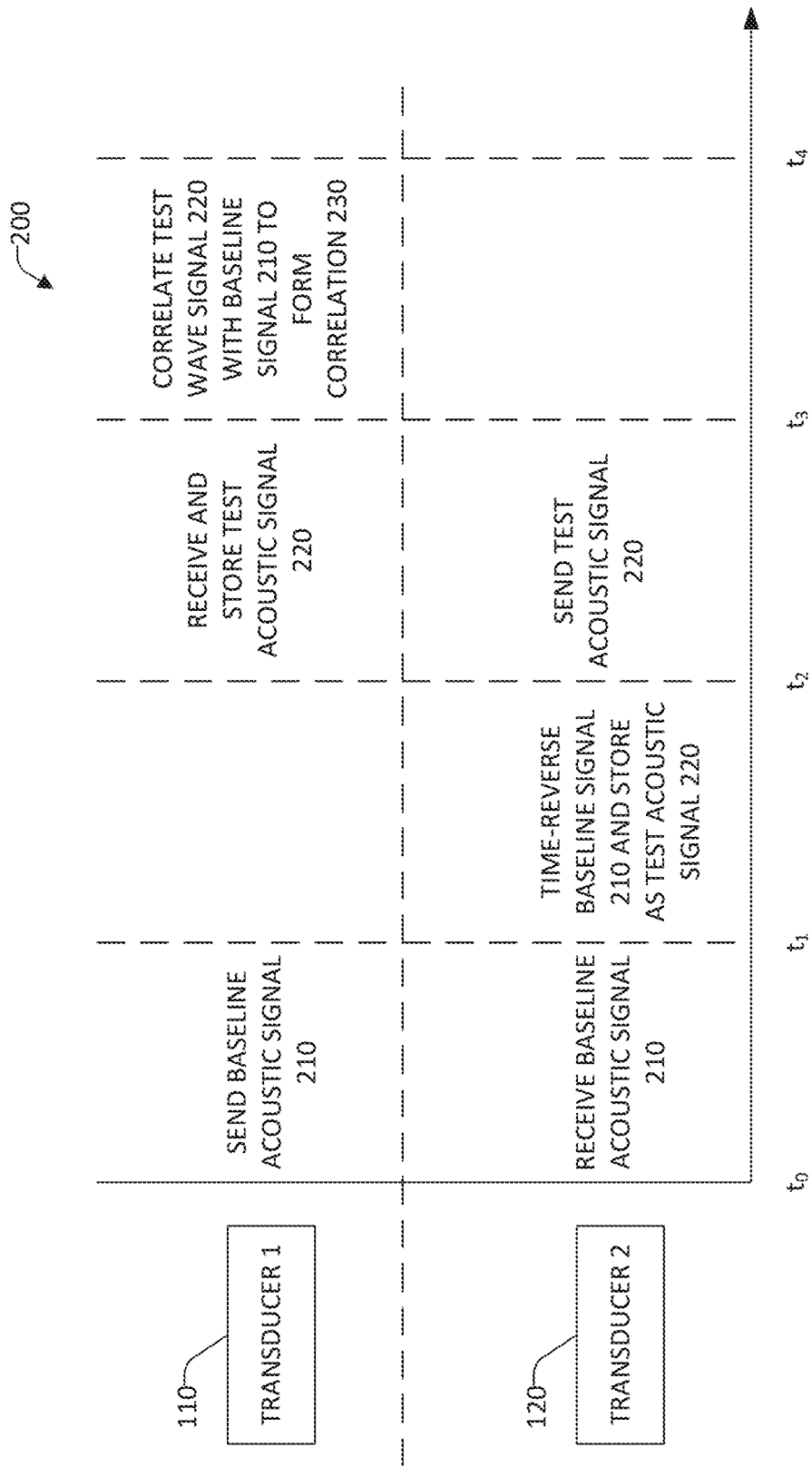
FIG. 2 shows a timeline of an exemplary baseline measurement 200 setup.

FIG. 2 shows a timeline 200 of the baseline measurement setup. To begin the baseline measurement, from time $t_0$ to $t_1$, transducer 110 emits a baseline acoustic signal 210 at a known frequency. The baseline acoustic signal may be represented, for example, as signal 150 in FIG. 1B. It traverses environment of interest 130 and interacts with object 125. During the period from $t_0$ to $t_1$, the baseline acoustic signal 210 is received by transducer 120. The received version of baseline acoustic signal 210 includes information associated with the interaction of baseline acoustic signal 210 and the environment of interest 130 and object 125.

From time $t_1$ to $t_2$, this received baseline acoustic signal 210 is stored in machine-readable storage associated with transducer 120. It is understood that when it is indicated that an acoustic signal is stored in computer-readable storage, an electronic representation (in digital or analog form) is what is stored in the computer-readable storage. Any suitable machine-readable storage may be used, including memory (e.g., RAM, ROM, EEPROM, etc.), disk, etc. Electronics associated with transducer 120 (e.g., a multi-purpose computer, dedicated electronics, application specific integrated circuits, other integrated circuits) then time-reverses the received baseline acoustic signal 210 to create test acoustic signal 220. Test acoustic signal 220 is a time-reversed version of baseline acoustic signal 210 as received by the transducer 120, which means that it effectively reverses the baseline signal 210 in time. This test signal 220 is then stored locally to transducer 120. Transducer 110 may also store baseline acoustic signal 210 locally.

From time $t_2$ to $t_3$, transducer 120 sends the test signal 220 into the environment of interest 130. Transducer 110 receives the test signal 220 after it has traversed environment 130 and interacted with the environment 130 and object 125. Note that, in this case, when test signal 220 traverses environment 130, the environment 130 is still in the "baseline" or unchanged condition (e.g., nothing has been moved, there have been no breaches, there has been no compromising). This received test signal 220 is then stored locally to transducer 110, as shown in FIG. 2. Received test signal 220 provides a baseline measurement of the environment of interest 130.

The stored test signal 220 can be referred to as a "reconstruction" of the original baseline acoustic signal 210. This is because the test signal 220, by virtue of being a time-reversed version of signal 210, should be approximately equivalent (but for magnitude) to the original signal 210 at its source transducer 110. Therefore, differences in the stored test signal 220 and the baseline signal 210 are caused by noise associated with the environment 130, noise associated with electronics, etc. It can be useful to compare this reconstructed signal 220 stored during the baseline measurement with the reconstructed signal created by sending the same test wave 220 through the environment 130 after a change. This will be discussed in more detail in the context of the testing procedure 300 shown in FIG. 3.

From time $t_3$ to $t_4$, electronics associated with transducer 110 may perform a mathematical "correlation" 230 between the stored test signal 220 and baseline signal 210. This mathematical correlation can provide a convenient quantification of the difference in two signals that may, in some cases, be superior to directly comparing their reconstructions. However, it is to be understood that correlation may not always be necessary. Sometimes it is sufficient to compare the baseline signal with the reconstructed signal, as described previously.

Since test signal 220 is a time reversed version of baseline signal 210 sent through the same baseline (unchanged) environment 130, the correlation 230 should be relatively high. The correlation 230 may be performed by number of suitable mathematical algorithms, including via the following equation:

$$\text{Corr}(p, q) = \int_{-\infty}^{\infty} p(\tau + t)q(\tau)d\tau \quad (1)$$

where p and q are the signals being correlated (e.g., baseline signal 210 and test signal 220) and t is a time constant. Correlation 230 can set the baseline measurement. If/when later transmissions of test signal 220 through environment 130 lead to a substantially lower correlation than correlation 230, it can be interpreted that a change (e.g., tamper, intrusion, etc.) has occurred in environment 130.

Testing Measurement

FIG. 3 shows a timeline of a testing measurement 300 that may be performed after, and with respect to, the baseline measurement 200. Note that testing measurement 300 may be performed from time to time after baseline measurement 200. For example, once the baseline measurement 200 is set, the environment 130 can be monitored for an alteration to the environment 130 according based upon the testing measurement 300. The testing measurement 300 may be generated after there is a potential change in condition to the environment 130. For example, a change to the environment 130 may be assumed possible after a substantial amount of time (e.g., 5 minutes, 2 hours, 1 day, etc.) has passed since baseline measurement 200. There may, alternatively, be other reasons to believe that the environment 130 has changed after the baseline measurement 200 was generated. These other reasons may include, for example, indications of breach, such as security cameras indicting traversal by unknown persons of a secured perimeter. All of these situations will be referred to, throughout this disclosure, the environment being an in "unknown" condition, as opposed to being in a known (baseline) condition.

From time $t_0$ to $t_1$, in the testing measurement 300, transducer 120 emits the test acoustic signal 220. Again, this test signal 220 is a time-reversed version of the baseline signal 210 as received by transducer 120 in the baseline measurement 200. If environment 130 has not changed since the baseline measurement 200, this time-reversed signal 220, when received at transducer 110, should be highly correlated to the baseline signal 210. The test acoustic signal 220, once it has traversed and interacted with environment 130 and object 125, is then detected and stored by electronics associated with transducer 110.

As discussed above, the reconstructed test signal 220 in an unknown condition, after a potential change in environment 130, can be directly compared to the baseline signal 210. Large differences between such signals should, by themselves, indicate a change in environment 130.

It may also be advantageous, at this stage, to perform a mathematical correlation of the reconstructed test signal 220 during testing 300 with the baseline signal 210. This second correlation 310 may be performed from time $t_1$ to $t_2$ by electronics associated with transducer 110. Correlation 310 correlates the test signal 220 after having traversed the environment 130 while the environment 130 is in an unknown (e.g., potentially no longer in the baseline) condition, as described above.

From time $t_2$ to $t_3$, correlations 230 and 310 can be compared to determine whether there has been a change in environment 130 since the baseline measurement 200. More specifically, this step determines whether correlation 310 is substantially lower than correlation 230. If not, then there was likely no change in environment 130 since baseline measurement 200. In other words, there has likely been no breach or tampering, for example. On the other hand, if the correlation 310 is substantially lower than correlation 230, this could mean that a change in environment 130 has occurred. More specifically, a change in environment 130 may have made reconstruction at the original source 110 transducer provided by time-reversal test signal 220 during testing 300 less able to reproduce the original baseline signal 210 than it was during the baseline measurement 200.

Flowchart Overview

Figure 4A:
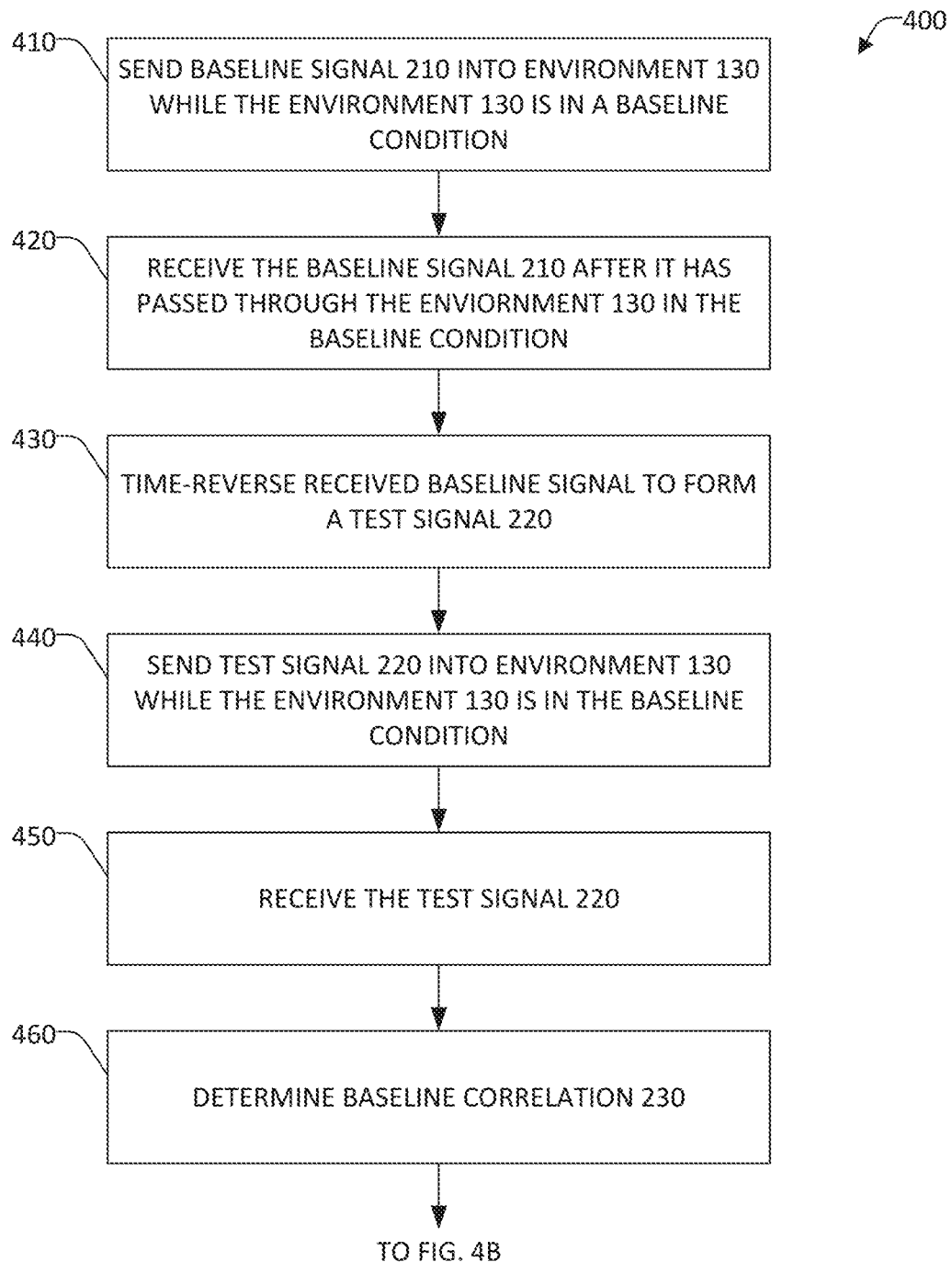
FIG. 4A shows the first part of an exemplary flowchart 400 for detection of a change in environment 130 shown in terms of signaling in FIGS. 2 and 3.
Figure 4B:
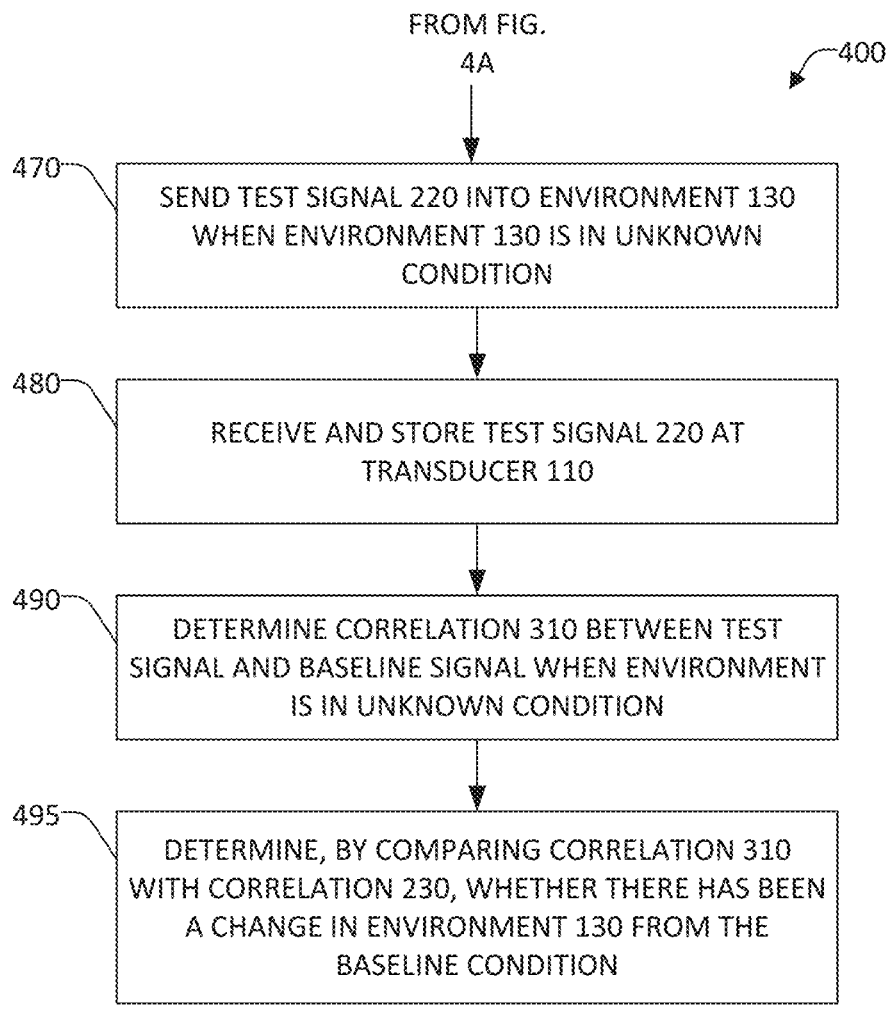
FIG. 4B continues flowchart 400 of FIG. 4A.

FIGS. 4A-4B present a flowchart 400 that gives an overview of the baseline measurement of FIG. 2 and the testing measurement of FIG. 3 together used to detect a change in the environment 130. Steps 410-460 shown in FIG. 4A are all performed when environment 130 is in a baseline condition. In fact, the condition of environment 130 during steps 410-460 can be said to define the current baseline condition by setting the test signal 220 based on traversal of the baseline signal 210 through the environment 130.

As shown in FIG. 4A, the first step 410 is to send the baseline acoustic signal 210 via transducer 110 through the environment 130 while the environment is in a baseline condition. This corresponds to time $t_0$ to $t_1$ in the baseline measurement 200 shown in FIG. 2.

The next step 420, also corresponding to time $t_0$ to $t_1$ in FIG. 2, is for transducer 120 to receive baseline signal 210. In step 430, the received baseline signal 210 is time-reversed to create test signal 220. This corresponds to time $t_1$ to $t_2$ in FIG. 2. In step 440, the test signal 220 is sent across environment 130 and received by transducer 110. This corresponds to time $t_2$ to $t_3$ in FIG. 2. In step 450, the test signal is received by the transducer 110. Next, in step 460, a correlation 230 between test signal 220 and baseline signal 210 is determined. This corresponds to time $t_3$ to $t_4$ in FIG. 2. Step 460 ends the baseline measurement 200 process represented by FIG. 2.

Turning to FIG. 4B, steps 470-490, corresponding to test 300 of FIG. 3, are performed after there could possibly be a change in environment 130 from its baseline condition. Steps 470-490 are employed to determine whether such a change occurred. As discussed above, this correlates to environment 130 being in an "unknown" condition that may or may not differ from the baseline condition.

Step 470 begins with transducer 120 sending the stored acoustic test signal 220 into environment 130. Step 470 corresponds to time $t_0$ to $t_1$ in FIG. 3, beginning the generation of the testing measurement 300. At step 480, transducer 110 receives and stores the test signal 220 in order to perform the new correlation 310 to determine whether or not there has been a change in the environment 130 from the baseline condition.

In step 490, a mathematical correlation 310 may be evaluated with respect to the received and stored test signal 220 and the original baseline signal 210. This corresponds to time $t_1$ to $t_2$ in FIG. 3.

In step 495, correlation 310 of signals while environment 130 is in the unknown condition is compared with correlation 230 of signals while environment 130 is in the baseline condition. This corresponds to time $t_2$ to $t_3$ on signal diagram in FIG. 3. This comparison can determine whether or not there has been a change in environment 130.

Figure 5:
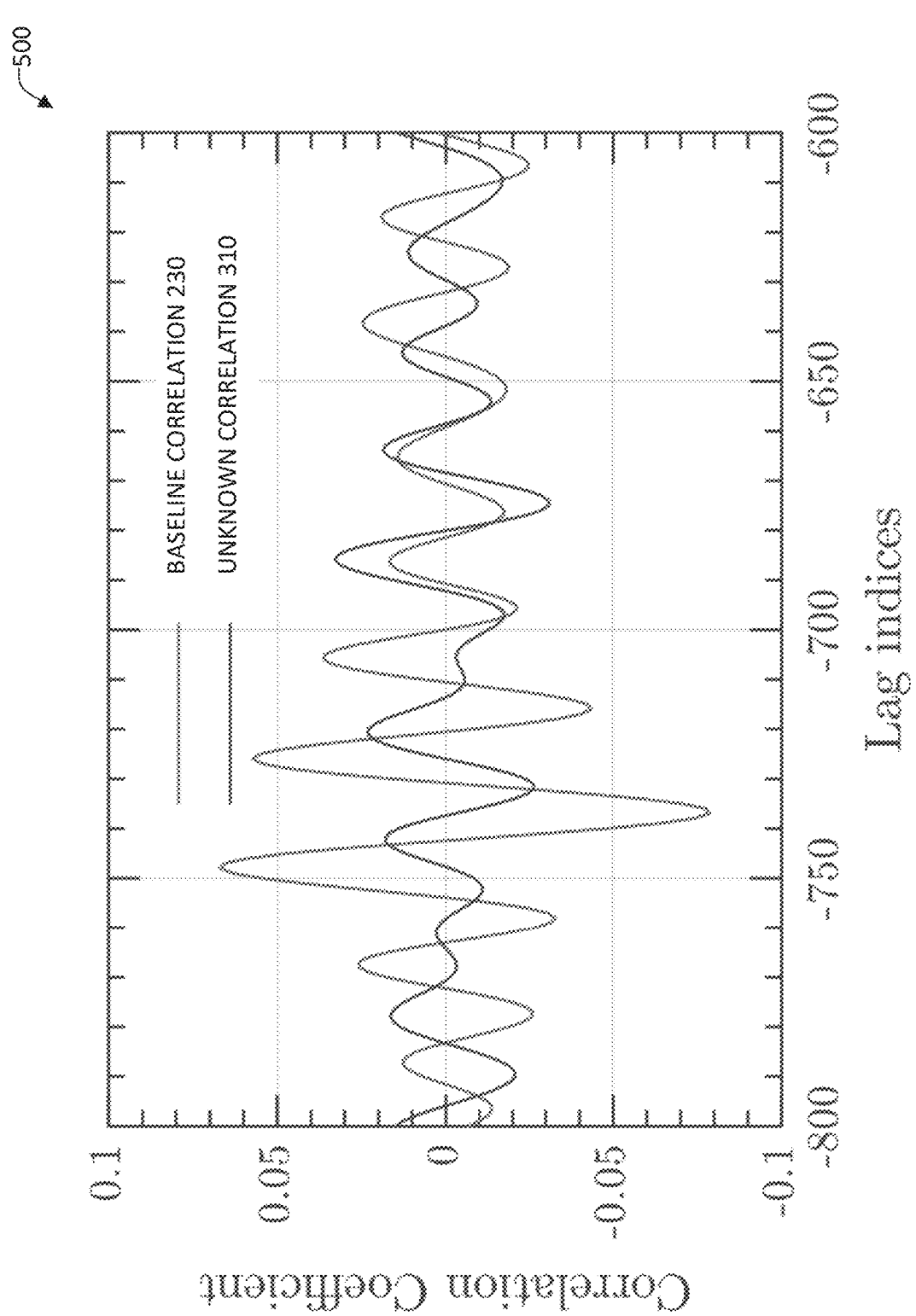
FIG. 5 shows a representative plot 500 of correlations 230 and 310 that might be compared in step 470 of 400.

FIG. 5 shows a plot 500 that depicts an exemplary comparison of experimental correlations between baseline and unknown environmental conditions from step 495. As shown in FIG. 5, the correlation in the baseline case 230 is measurably different than in the correlation 310 in the unknown case. At minimum, the plot 500 shows this difference, indicating there has been a change in environment 130 between the baseline and test conditions, potentially indicating a breach as described above. With respect to the plot 500, a quantitative analysis indicates that the baseline correlation 230 shown in FIG. 5 is actually three-fold higher than the correlation 310 when the environment 130 is in an unknown condition. This is a further indication that the change in environment from the baseline measurement (signaling 200 corresponding to steps 410-440) to when testing is performed (signaling 300 corresponding to steps 450-470) is quantitatively significant. This difference can provide an understanding of the magnitude of change represented by the breach. As described in more detail below, spatially resolving the magnitude of this change can provide further information as to where, why, and how the breach occurred.

EXAMPLES

Example 1—Numerical Prediction

Figure 6:
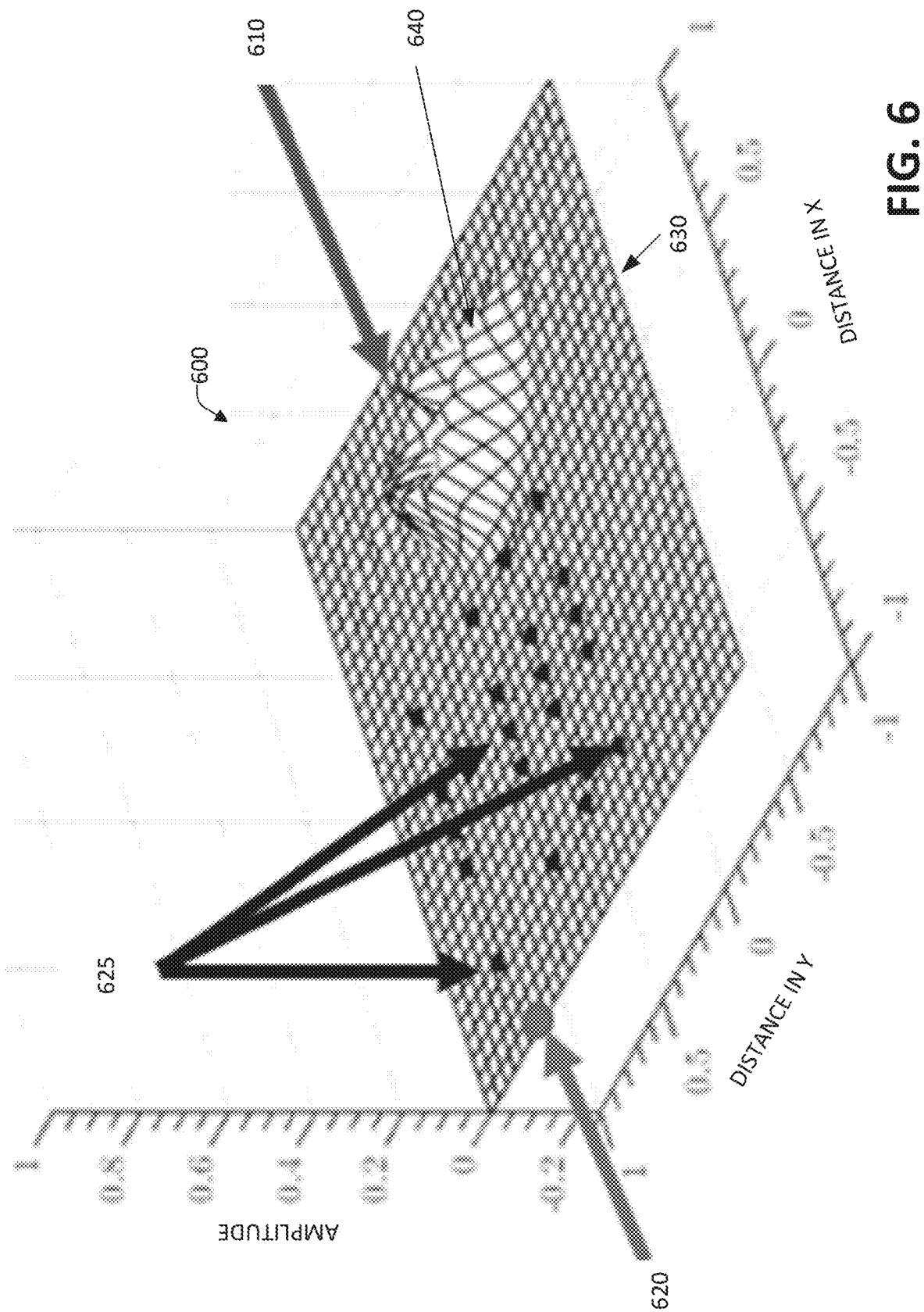
FIG. 6 shows the transducers 610 and 620 and environment 630 setup in a numerical simulation 600 before they interact with baseline signal 640.

Example 1 is a proof-of-concept numerical simulation that produced the correlations 230 and 310 shown in FIG. 5. FIG. 6 shows transducers 610 and 620 and environment 630 setup in the simulation 600. The x and y directions on the plot 600 represent distance in arbitrary units.

Figure 7A:
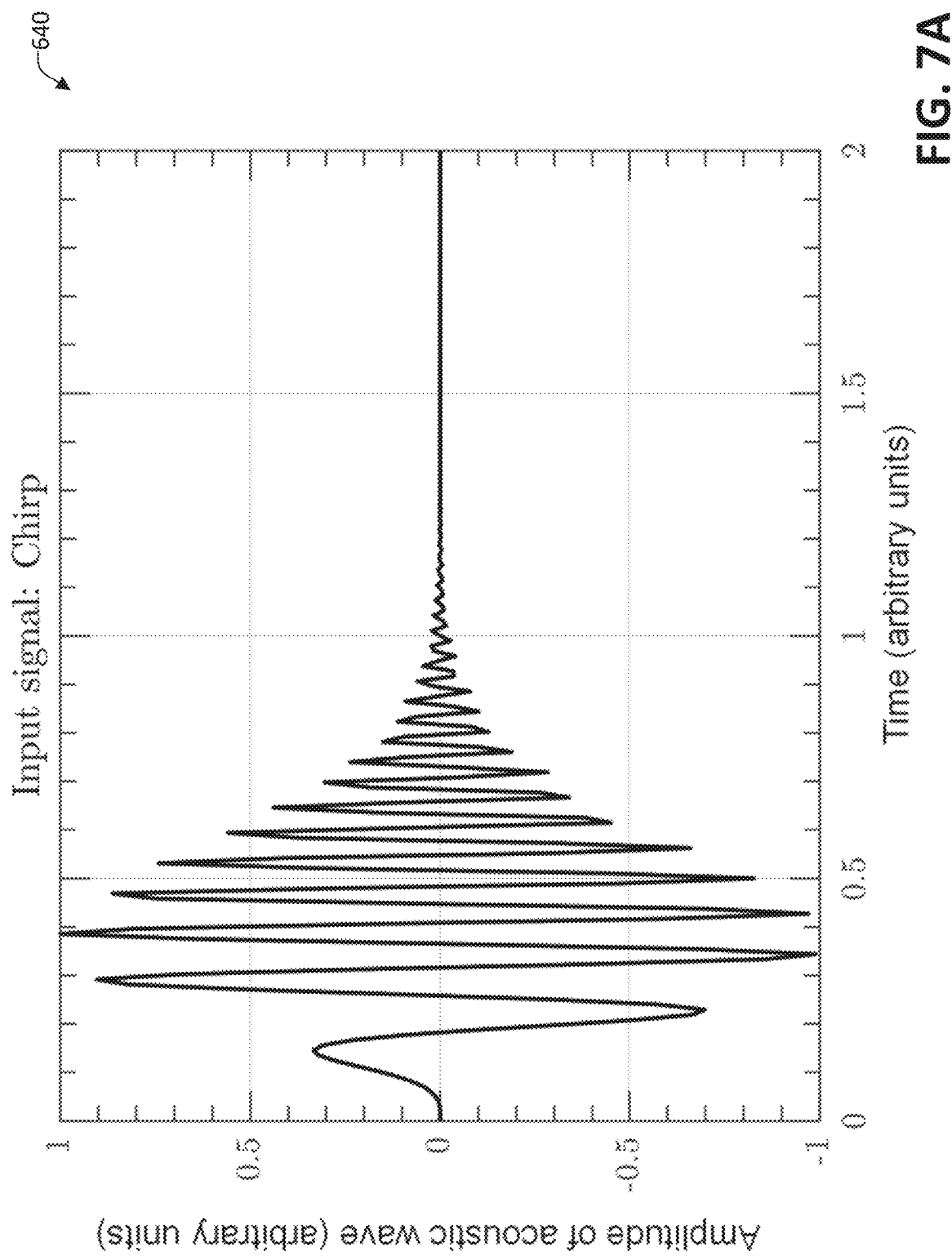
FIG. 7A shows the emitted signal form of baseline signal 640.

As shown in FIG. 6, transducers 610 and 620 are on either side of environment 630 (represented by the grid). FIG. 6 also shows a baseline signal 640 sent by transducer 610 through environment 630. The z direction in plot 600 represents the amplitude of baseline signal 640 (in arbitrary units) emitted from transducer 610. FIG. 7A shows the original signal form of baseline signal 640 as emitted from transducer 610, which is an audible "chirp".

Turning back to FIG. 6, the figure shows objects 625 in environment 630. In this simulation, objects 625 have a pin-like structure and shape and are located at certain positions on a grid in environment 630. However, it is to be understood that the shape of objects 625 and their placement in environment 630 is arbitrary and merely for the purposes of illustration. Any other objects 625 may be used with any placement in environment 630. Nor are the particular initial placements of objects 625 important. The point of the exercise is to detect a change in the placement of objects 625 from their initial placements.

Objects 625, regardless of size, shape, or specific placement will scatter sound signals traversing environment 630, including baseline signal 640. Transducer 620, placed opposite transducer 610 with respect to objects 625, can detect baseline signal 640 (e.g., as does transducer 120 in step 420 in FIG. 4A). Once detected, transducer 620 time-reverses the detected baseline signal 640 to create a test signal (not shown) and sends the test signal back to transducer 610 through environment 630 (steps 430 and 440 in FIG. 4A). A baseline correction 230 (FIG. 5) is then determined between the test signal received by transducer 610 after the test signal traverses environment 630 in the baseline condition (i.e., object 625 placement as shown in FIG. 6) and the original baseline signal 640 (step 460 in FIG. 4A). This completed the baseline measurement for Example 1.

Figure 7B:
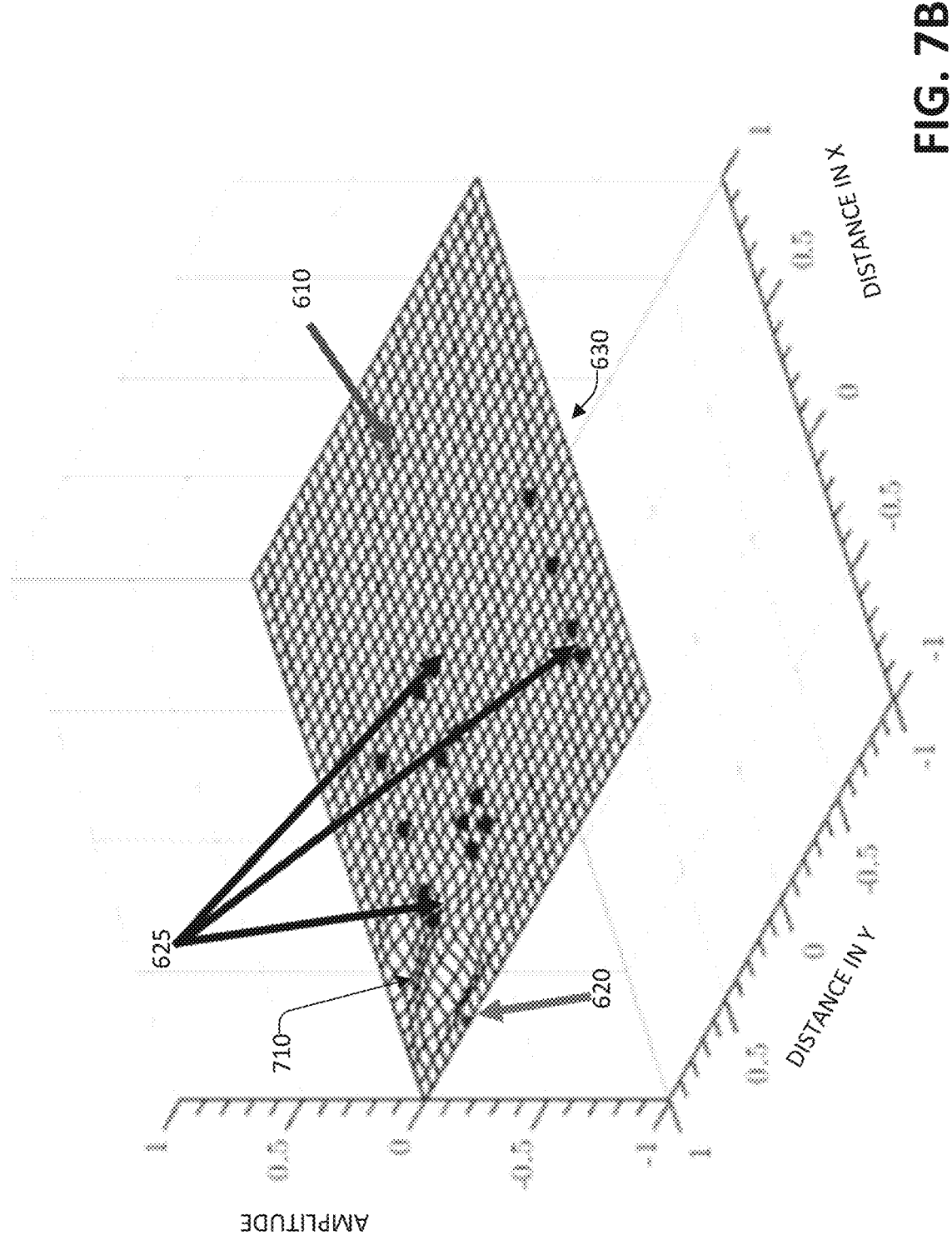
FIG. 7B shows rearrangement of objects 625 into different positions to represent a change in environment 630.

Subsequent to this baseline measurement, objects 625 were rearranged from their position shown in FIG. 6. The new arrangement 700 is shown in FIG. 7B. Specifically, some of the objects were moved to different locations in the environment 630. This simulates the environment 630 being in an "unknown condition" in which a change could have occurred. In this case, the "unknown" condition is actually a known, experimental control condition in which a change to environment 630 was deliberately made to occur for testing and verification purposes.

Once the environment 630 was changed, the testing procedure described in FIG. 4B (specifically, steps 470-495) was implemented. FIG. 7B shows a test signal 710 generated by transducer 620 being sent back through environment 630 after the change in objects 625 location (step 450). The test signal 710 is then received by transducer 610. Subsequent processing yields a second, "unknown" correlation 310 (step 490 in FIG. 4B), representing the correlation between test signal 710, after having traversed environment 630 after the rearrangement of objects 625 (i.e., in the simulated "unknown" condition), and the original baseline 640.

Turning back to FIG. 5, this plot shows the difference in correlations 230 and 310, as discussed above in the context of step 495. The difference in correlations 230 and 310 is approximately 5.2 standard deviations, with the baseline correlation 230 being significantly higher than the "unknown" correlation 310. This shows how relatively minor rearrangement of objects 625 in simulated environment 630 can lead to changes in correlations that are more than sufficient to be detected by this technique.

Example 2—Detection of Changes to 3D Printed Structures

Figure 8A:
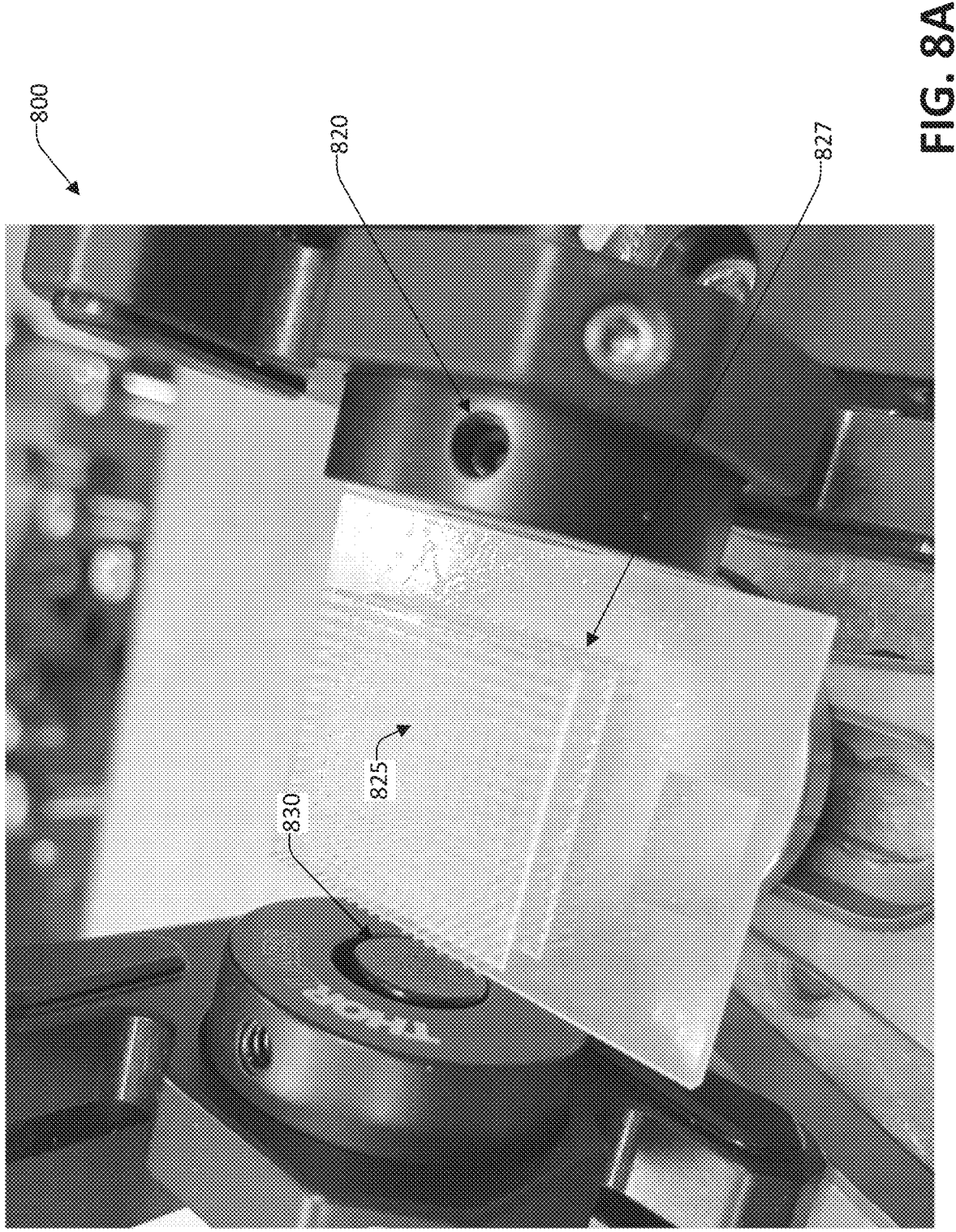
FIG. 8A shows a photograph of the physical setup 800 for Example 2.
Figure 8B:
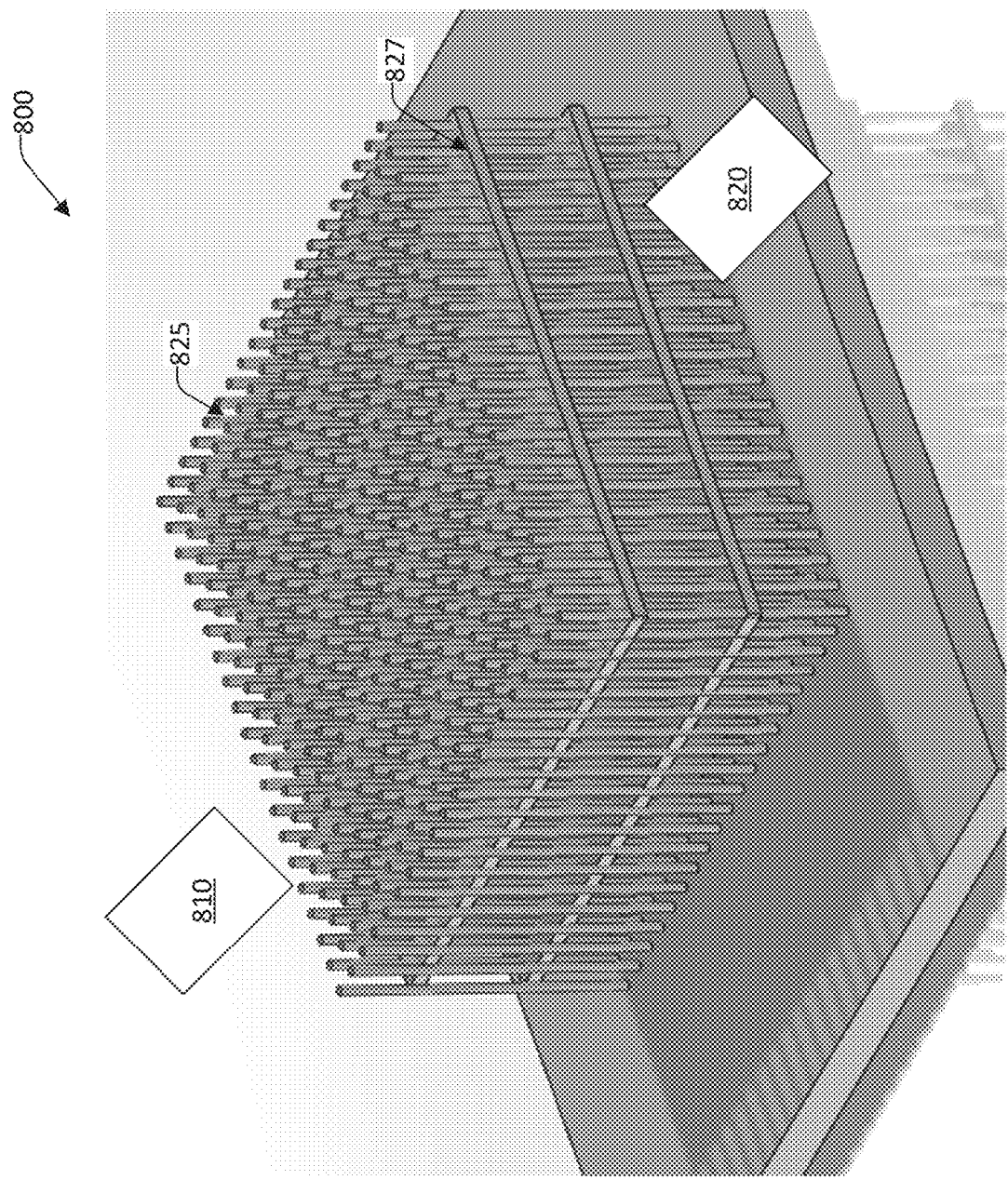
FIG. 8B is a schematic representation of the setup 800 in FIG. 8A for explanatory purposes.

FIGS. 8A and 8B show a second experimental configuration 800 meant to test the theory and practice of the disclosed techniques. FIG. 8A shows a photograph of the physical setup 800 for Example 2. FIG. 8B is a schematic representation of the setup 800 in FIG. 8A for explanatory purposes. Objects 825 and environment 830 result from 3D printing the structure. The pitch of the objects 825 is 1 mm. Their diameters were approximately 300 µm.

Baseline in Example 2 was defined as environment 830 having a full compliment of objects 825, as shown in FIGS. 8A and 8B. Testing was then run in the simulated "unknown" condition after four objects 825 were removed. The removed objects 825 were selected at random. The baseline signal 840 (not shown) sent by transducer 810 had a frequency of 300 kHz, or wavelength of $\lambda$=1.2 mm, in air. This means that the diameters of objects 825 were approximately ¼ of the wavelength of the baseline signal 840.

Both FIGS. 8A and 8B show transducers 810 and 820 on either side of environment of interest 830 with individual objects 825. As shown best in FIG. 8B, objects 825 are posts sticking upward out of a common frame 827. Objects 825 were essentially identical to within the resolution of the 3D printer used to make them (resolution of 20 µm in the x-y direction in the plane of the frame 825 and 5 µm in the z direction pointing out of plane and perpendicular to the diameter of objects 825).

Figure 9:
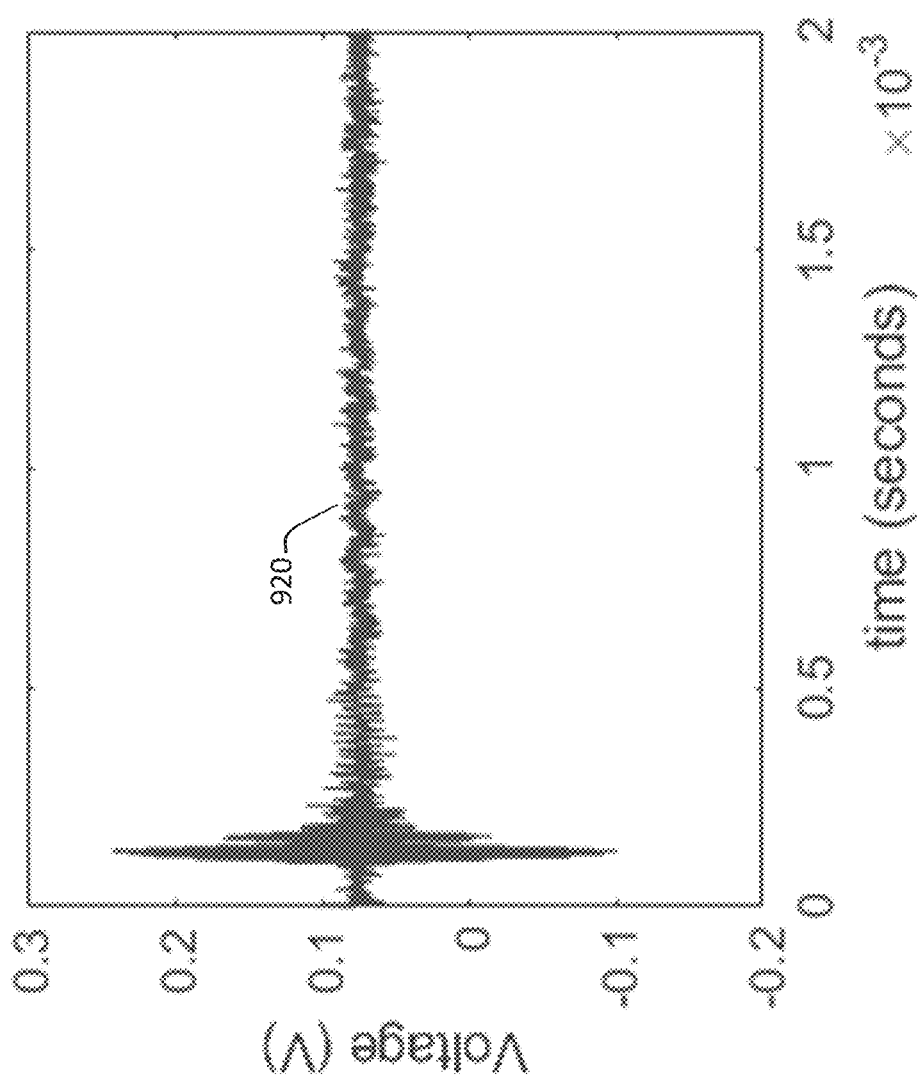
FIG. 9 shows baseline signal 840 as received by transducer 820.

FIG. 9 shows the baseline signal 840 as received by transducer 820, after the baseline signal 840 has traversed environment 830 in the baseline condition (i.e., with all objects 825 intact, as shown in FIGS. 8A and 8B). This received signal 840 is then time-reversed to create a test signal 920 according to steps 410-440 (FIG. 4A). The test signal 920 is then re-sent across environment 830 after environment 830 is no longer in the baseline condition (step 450).

Figure 10:
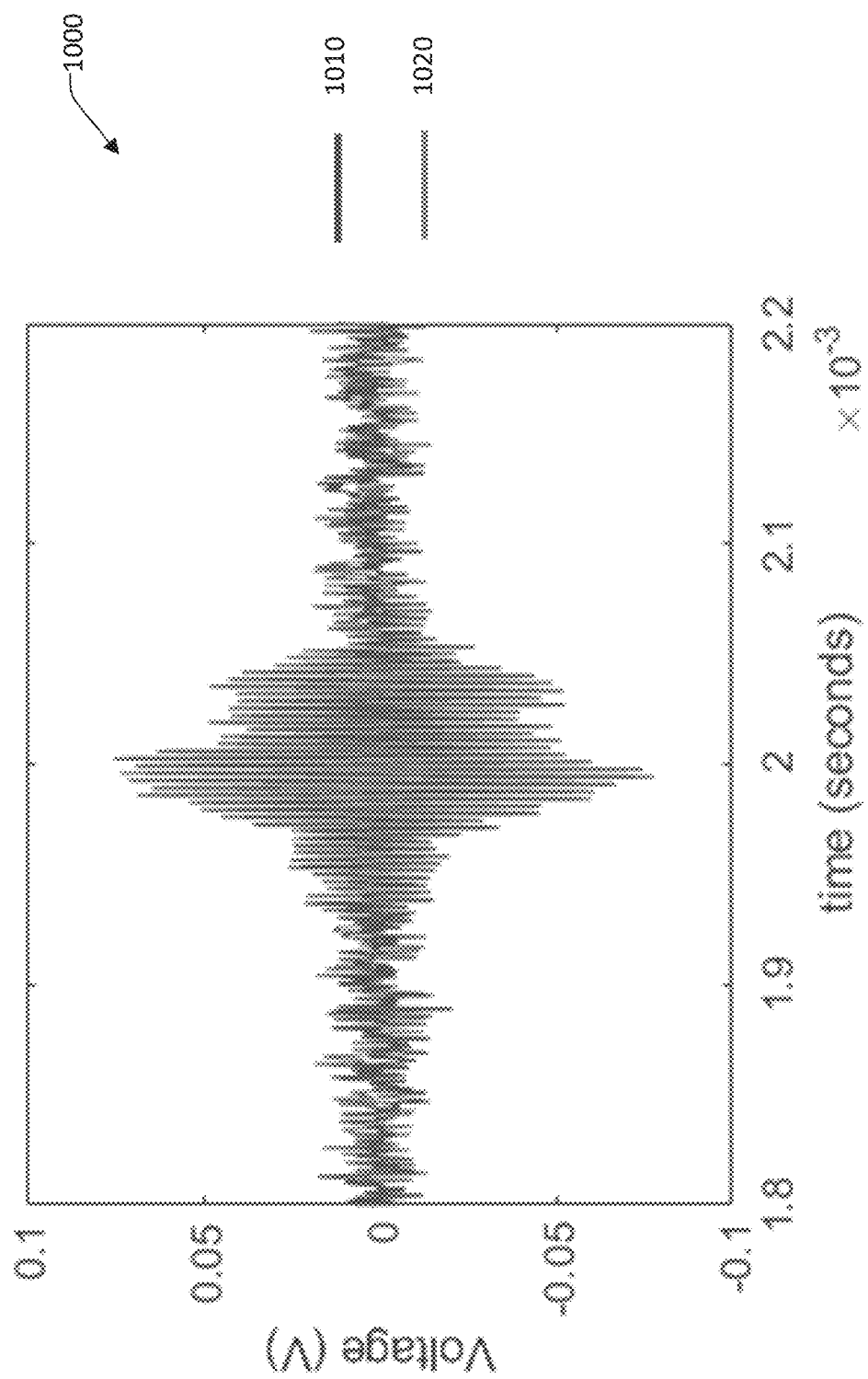
FIG. 10 shows two versions of the test signal 920 as received at transducer 810 after being sent by transducer 820 under baseline 1010 and the simulated "unknown" 1020 conditions.

FIG. 10 is a plot 1000 that shows two versions of the test signal 920 as received at transducer 810. The first signal 1010 is a reconstruction after the test signal 920 has been sent by transducer 820 through environment 830 under the baseline condition. The second signal 1020 is a reconstruction after the test signal 920 re-sent under the simulated "unknown" condition, i.e., after four objects 825 have been removed from environment 830. FIG. 10 clearly shows a difference in the received test signals 1010 and 1020 indicative of the change in environment 830 described above. Therefore, this difference in FIG. 10 alone could be used to determine that there has been tampering of the environment 830.

Figure 11:
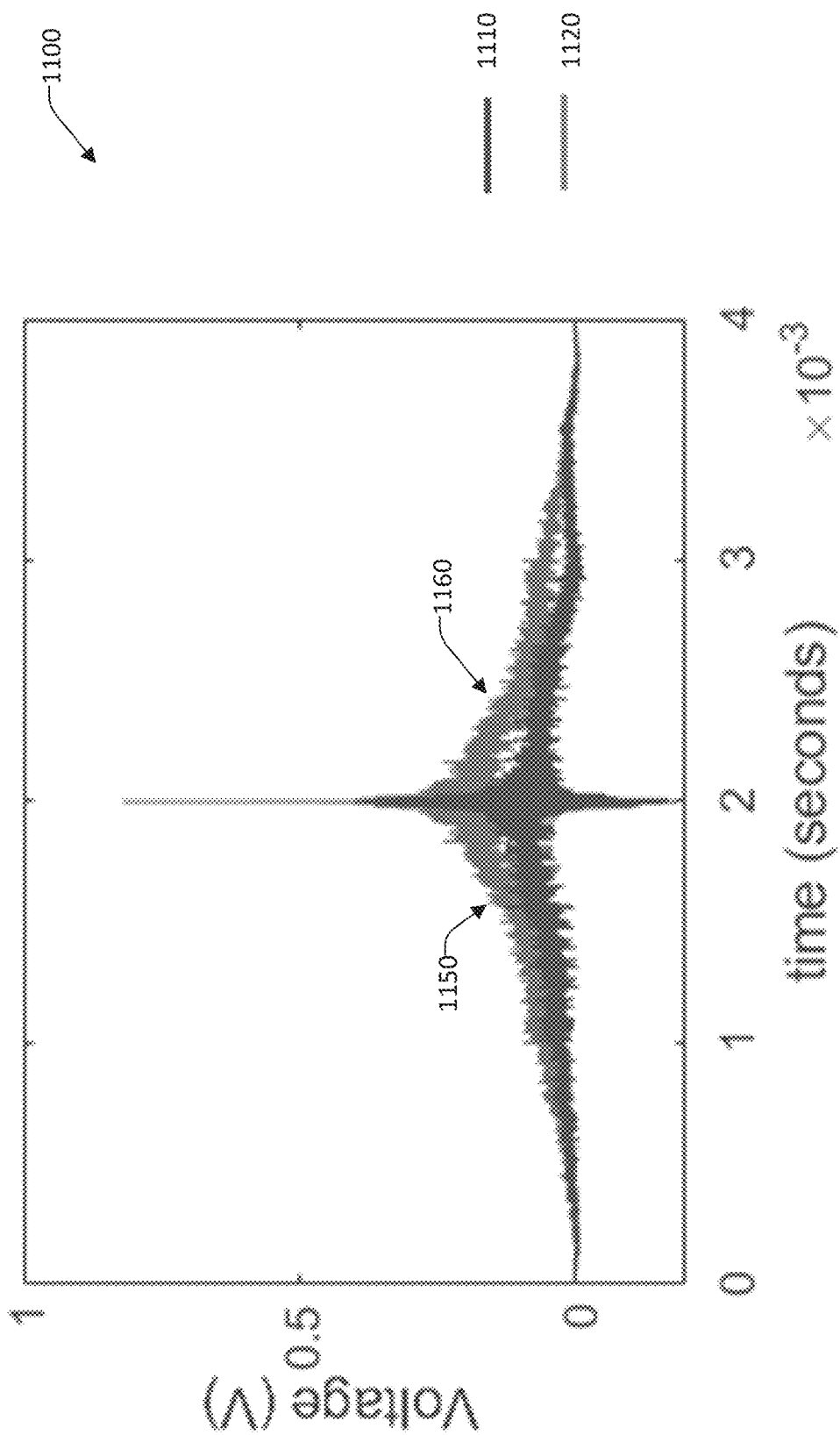
FIG. 11 shows the data in FIG. 10 after further mathematical processing (correlation) to more clearly and distinctly show differences in baseline from the "unknown" (i.e., altered) conditions.

FIG. 11 is a plot 1100 that shows the data in FIG. 10 after further mathematical processing to more clearly and distinctly show differences between baseline and the "unknown" (e.g., altered) conditions. Data in FIG. 11 is obtained by mathematically correlating the received test signals 1010 and 1020 in FIG. 10 with the original baseline signal 840, e.g., via equation (1). FIG. 11 shows how the correlation of the baseline testing data 1110 clearly differs from the testing data under the unknown condition 1120. In particular, FIG. 11 shows how there is greater spreading of the correlated signal for the testing data under the unknown condition 1120 at positions 1150 and 1160 than in the baseline testing data 1110. This indicates that there has been a change in environment 830 since the correlation is lower for 1120.

Note that comparison between the data in FIGS. 10 and 11 reveals that either plot would support the conclusion that a change has occurred in environment 830. FIG. 10 shows the reconstructed signal of the test signal at transducer 810, both in the baseline case 1010 and the unknown case 1020. The fact that these curves are not identical to within error indicates the environmental change. FIG. 11, however, shows that comparing correlations 1110 and 1120 can amplify the observed difference in the baseline and unknown measurements. This amplification can be particularly useful when the change in the environment 830 is relatively small.

Example 3—Effect of Additional Transducers

Figure 12:
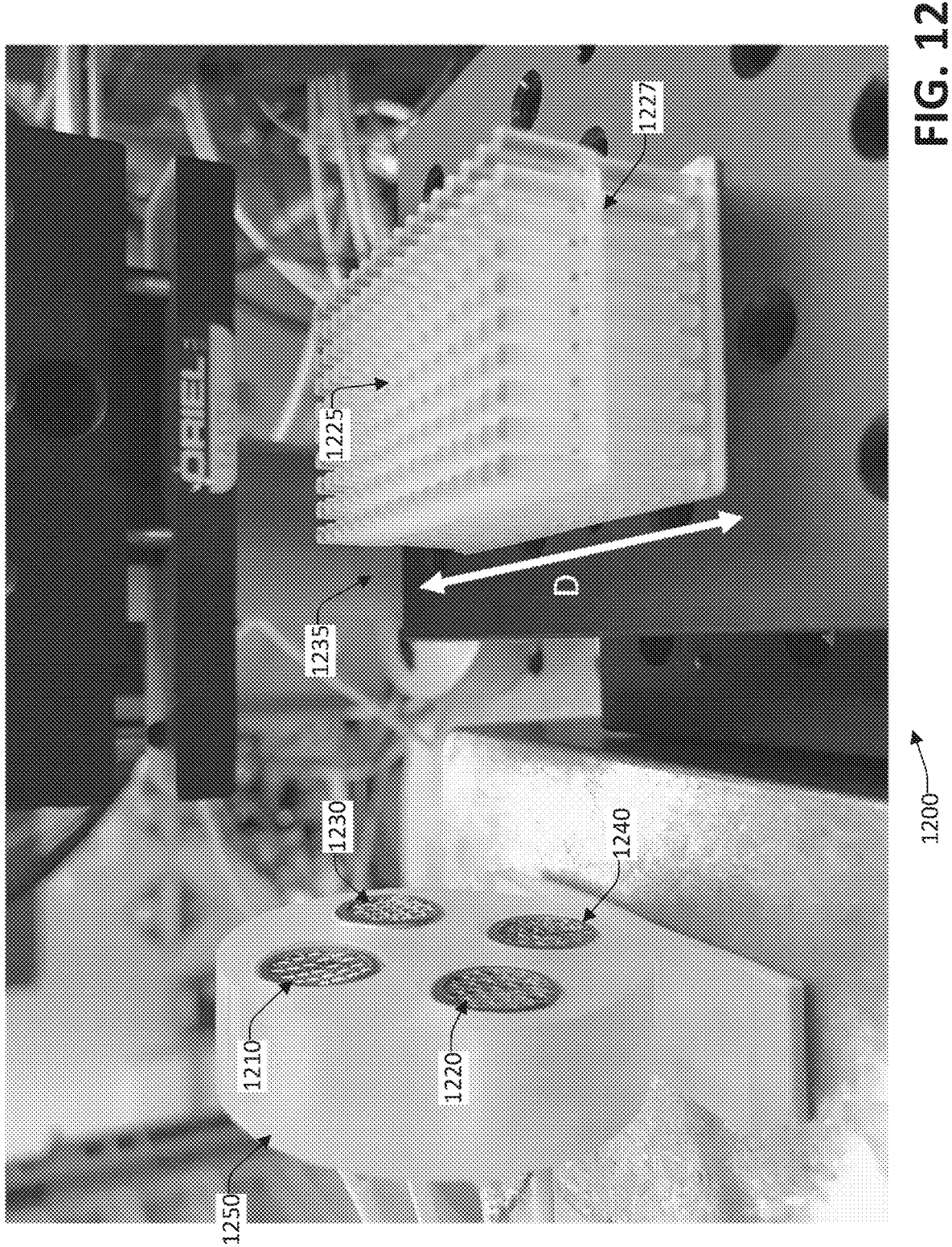
FIG. 12 shows a testing setup 1200 that probes the spatial resolution of techniques disclosed herein.

For Example 3, additional transducers were added and tested by using a mobile stage to move the subject environment. The testing setup 1200 is shown in FIG. 12. One purpose is to test this setup 1200 and the spatial resolution of the technique.

The subject environment 1235 shown in FIG. 12 is similar to environment 830 shown in FIGS. 8A and 8B. Specifically, objects 1225 are 3D printed in the manner described in the context of environment 830. Similar to in FIG. 8A, objects 1225 are post-like projections from a common frame 1227. The pitch of the objects 1225 is 3 mm. Their diameters were approximately 2 mm.

As shown in FIG. 12, setup 1200 includes a unit 1250 with four transducers 1210-1240. In the experiments described below, transducers 1210, 1220, and 1230 can be used to receive a baseline signal sent by transducer 1240. The frequency of the baseline was 40 kHz. Transducers 1210, 1220, and 1230 can then send time-reversed, receive baseline signals, test signals, back through environment 1235. The test signals are then received by transducer 1240 where they form a reconstruction of baseline signal. Here the baseline and test signal are used in a reflection mode arrangement, different from setups 100, 600, and 800 which operate in transmission mode.

The common frame 1227 is mechanically coupled to a motor (not shown) that allows controlled displacement of the frame 1227 along direction D. During Experiment 3, the frame 1227 was moved by 0.05 mm steps along direction D and correlation data (e.g., of the kind shown in FIG. 11) collected at each step. The results are shown in FIGS. 13 and 14.

Figure 13:
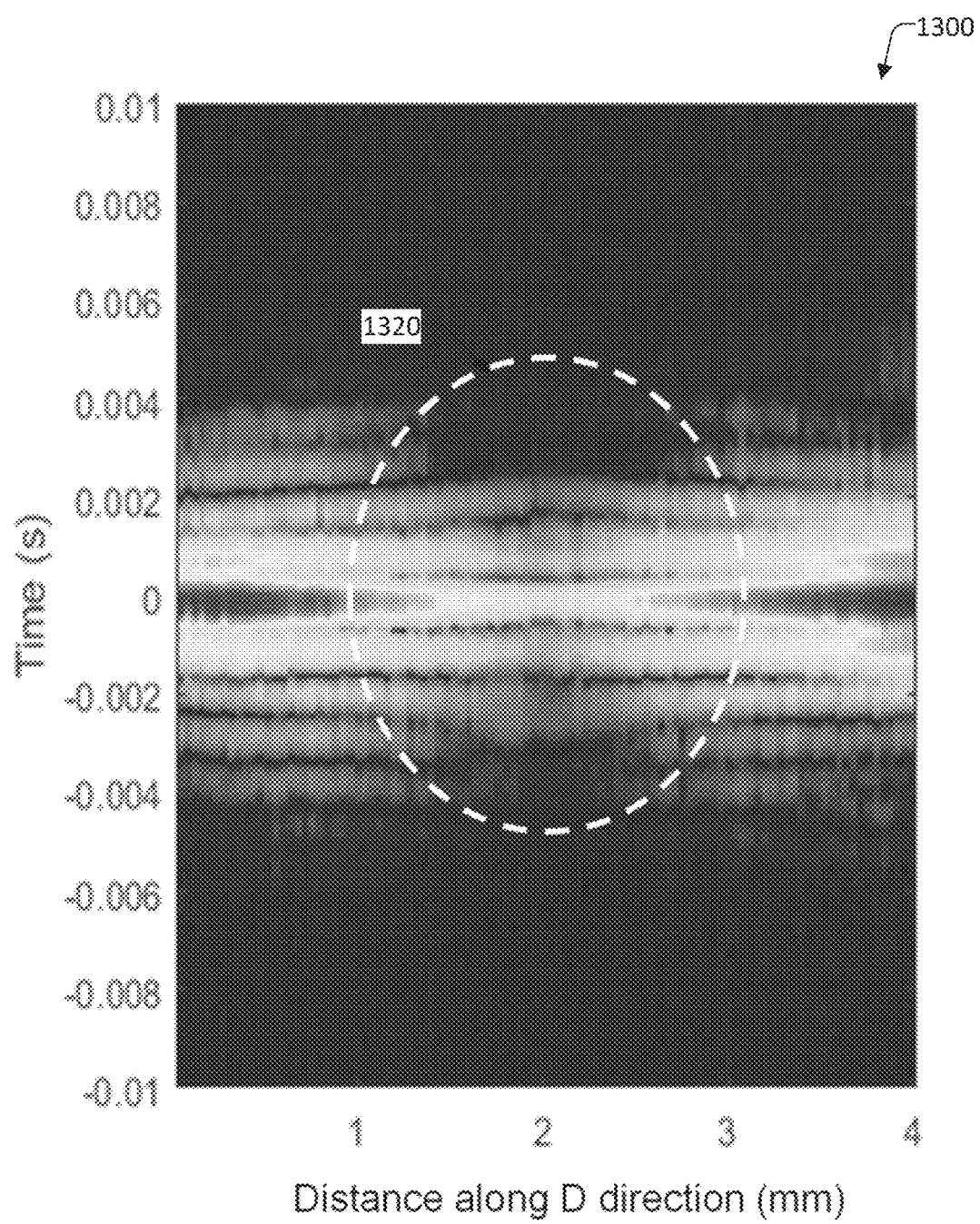
FIG. 13 plots correlation against movement of frame 1225 along D (x-axis) for setup 1200 using one transducer to receive.

FIG. 13, in particular, plots correlation (e.g., as in FIG. 11) against movement of frame 1225 along D (x-axis). The plot 1300 in FIG. 13 shows considerable variation in correlation with distance of frame 1227 along D. In particular, plot 1300 shows a central region 1320 where there appears to be a significant difference in correlation due to increased scattering. Importantly, the data in FIG. 13 reflects usage of 1 receiver, for example, transducer 1210 in FIG. 12.

Figure 14:
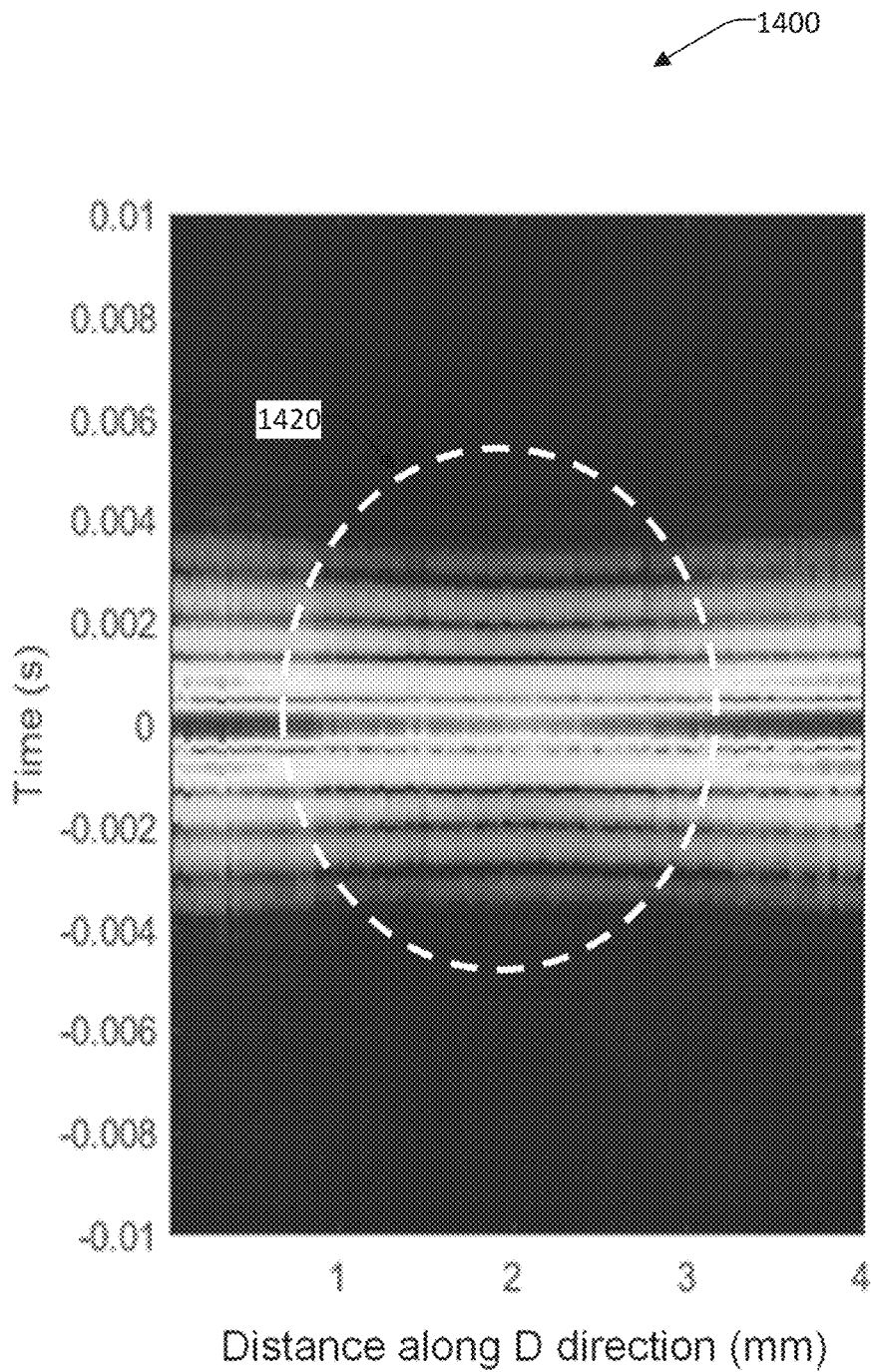
FIG. 14 is a plot that depicts correlation against movement of frame 1225 along D (x-axis) for setup 1200 using three transducers to receive.
Figure 15:
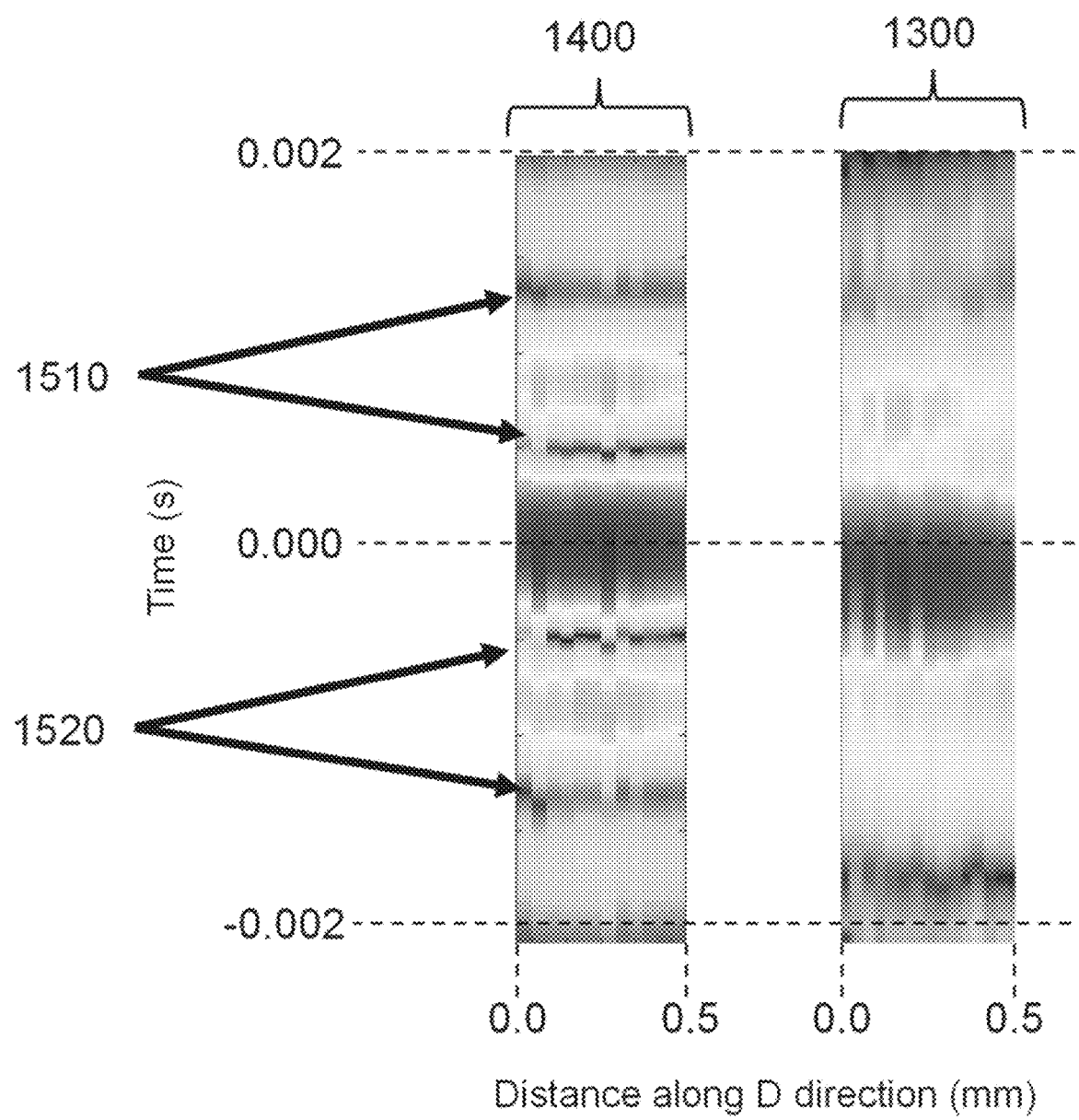
FIG. 15 compares the correlation resolution achieved by using one transducer for receiving (1300) against using three (1400).

FIG. 14 shows data collected for the same experiment as in FIG. 13, this time run when using all three receivers, i.e., each of transducers 1210, 1220, and 1230. In other words, the data in FIG. 14 was obtained using four total transducers, 1210-1240, while the data in FIG. 13 was obtained using only two. As expected, the correlation data in plot 1400 of FIG. 14 follows the same general pattern as the correlation data in FIG. 13. In particular, FIG. 14 shows a similar region 1420 to region 1320 where there is relatively low correlation due to increased scattering because of the position of the transducers relative to the objects 1225. The main difference between the plots 1400 and 1300 is that the increased number of transducers involved in producing 1400 results in substantially greater resolution. This is clarified in FIG. 15 which compares sections of 1300 and 1400 that are ±0.002 s about the time origin over the first 0.5 mm of movement of frame 1225 along D. One can see extra fine structure 1510 and 1520 in the 1400 data. This fine structure is absent from the 1300 data, despite that the overall behavior shown in 1300 and 1400 is similar. This reflects an increased resolution in the 1400 data corresponding to using an increased number of receivers in this version of the experiment.

Overall, these measurements show that the setup in FIG. 12 can achieve a ~100 μm feature detection when using a 40 kHz baseline signal, which is sub-wavelength detection. Since this result is presumably scalable, it suggests still higher resolution at increased frequencies. For example, it suggests 12 μm feature detection when using baseline signals around 300 kHz.

Example 4—Detecting Changes to Printed Circuit Board

Figure 16A:
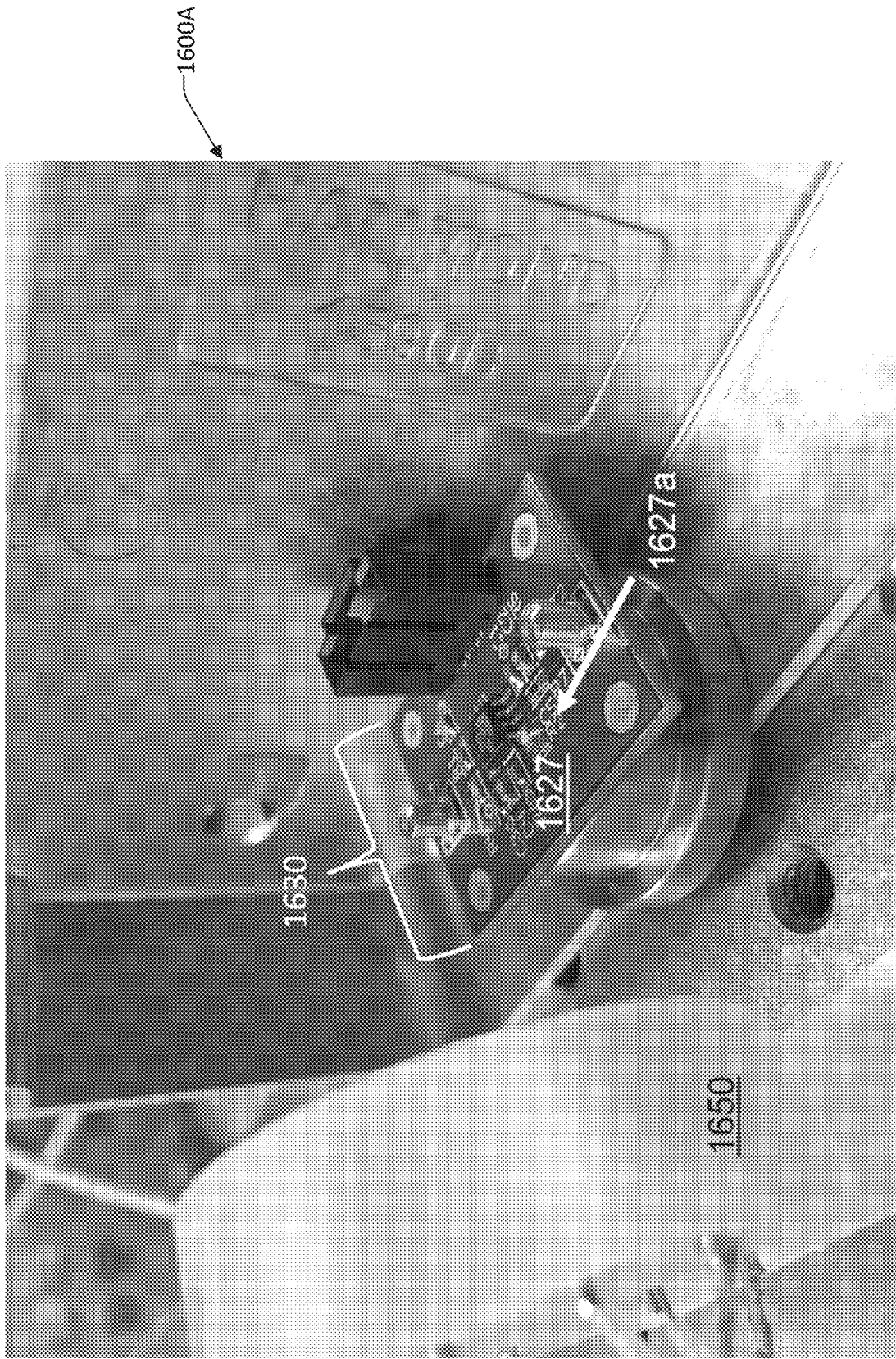
FIG. 16A shows an experimental setup 1600a including a Printed Circuit Board (PCB) 1627.

Example 4 provides a proof of concept that the technique can measure relatively small changes to an environment. Specifically, Example 4 shows how relatively minor changes to a printed circuit board (PCB) can be detected. The setup 1600a before the change, at baseline, is shown in FIG. 16A. As shown in FIG. 16A, the setup 1600a is similar to the setup 1200 in FIG. 12, except that it includes a unit 1650 with eight transducers and the subject environment 1630 includes a PCB 1627. Dimensions of PCB 1627 are 32.3 mm×25.4 mm. PCB 1627 has a capacitor site 1627a that is subject to change.

Figure 16B:
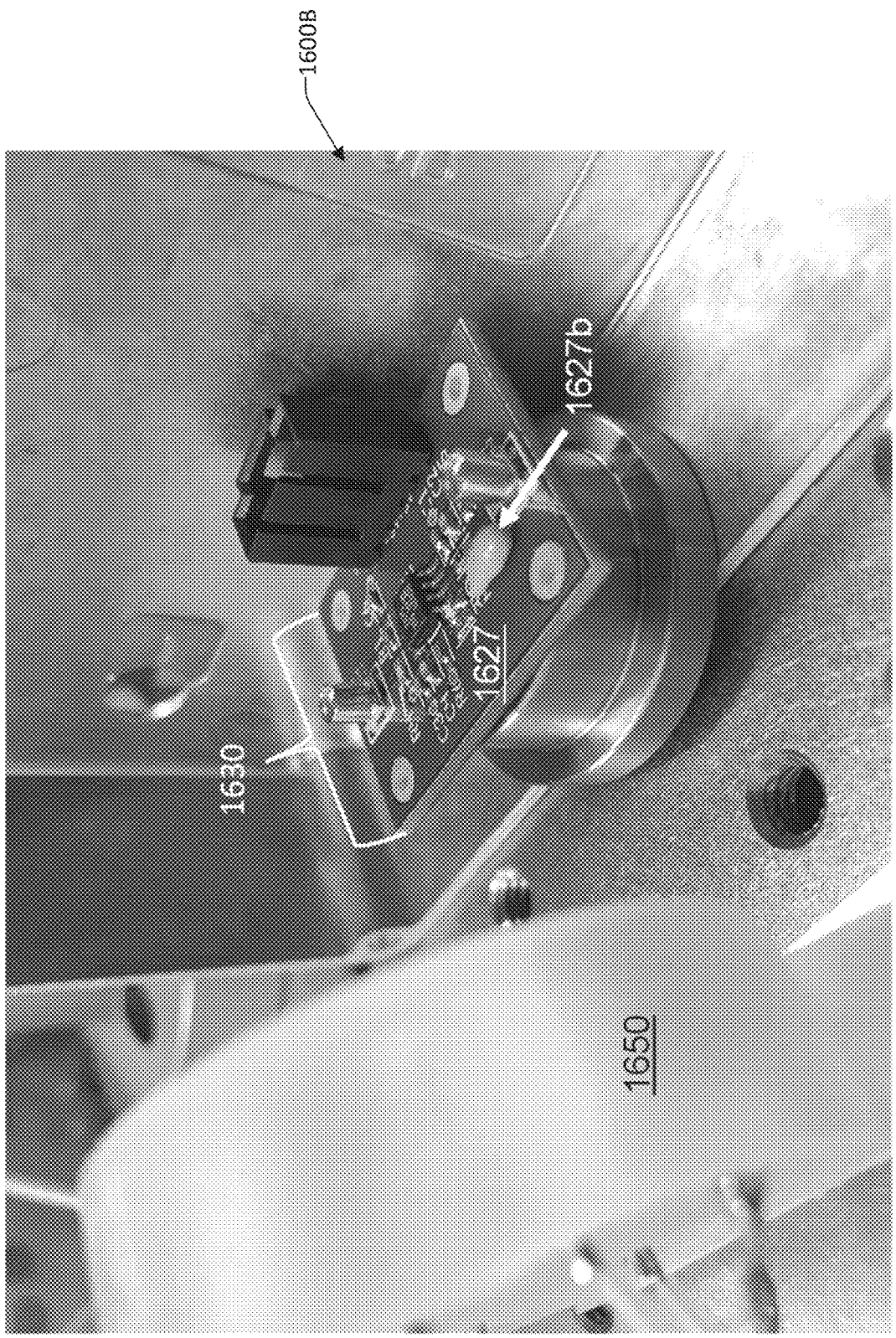
FIG. 16B shows an experimental setup 1600b with a capacitor 1627b of PCB 1627 replaced.

FIG. 16B shows that change after baseline, namely capacitor 1627b has been added to capacitor site 1627a. One of the purposes of Example 4 is to determine the detectability of this change to environment 1630. Two different type of replacement capacitors 1627b were used, one made of tantalum and the other a film capacitor. These changes are discussed in more detail below.

Figure 17A:
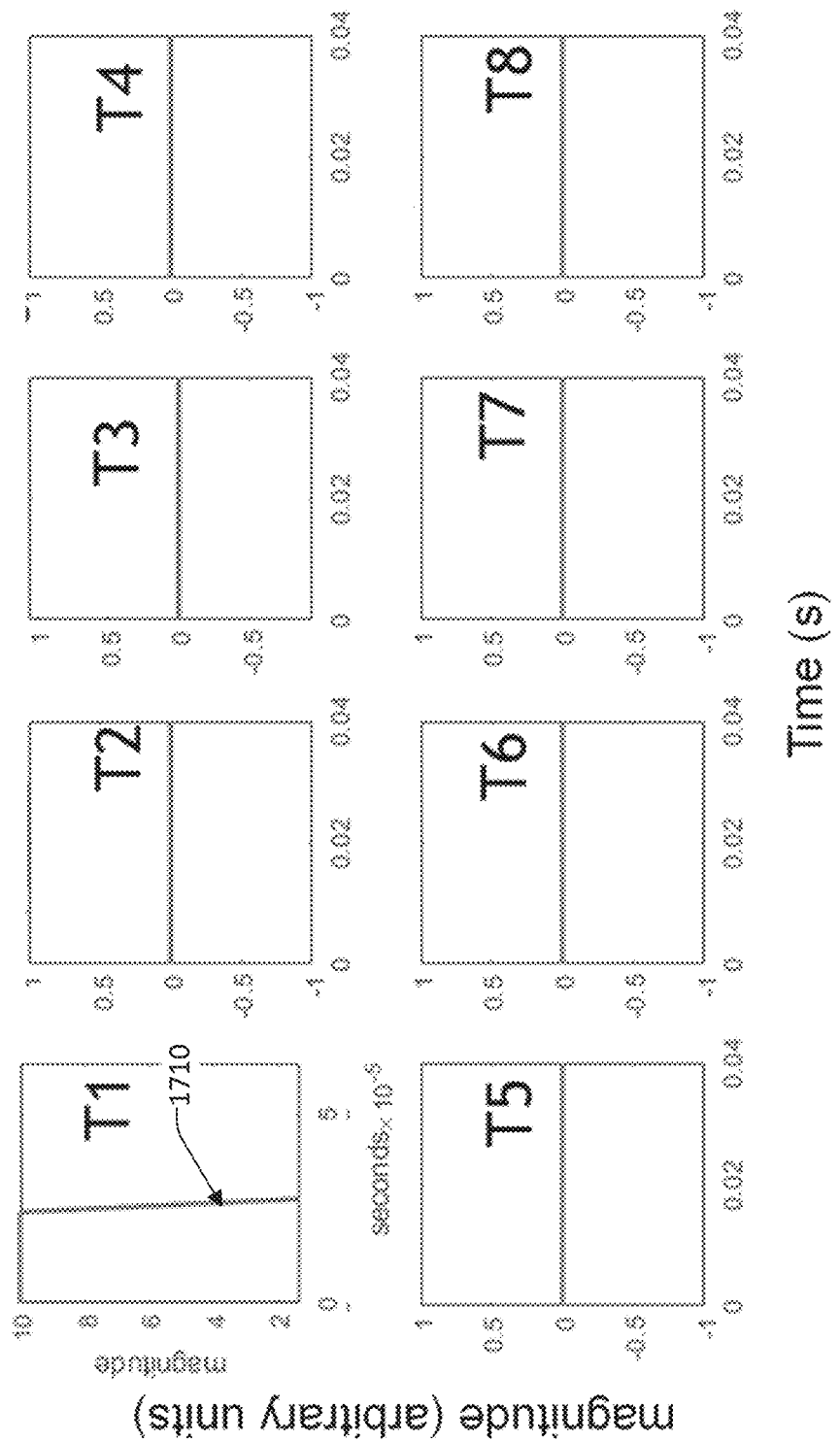
FIG. 17A shows the status of transducers T2-T8 in unit 1650 during emanation of the baseline signal (pulse) 1710 by T1.

FIG. 17A shows the status of each of the eight transducers T1-T8 during emanation of the baseline signal (pulse) 1710. These transducers will be designated with a "T" when acoustic transmission is being discussed and an "R" when receipt of an acoustic transmission is being discussed. However, it is to be understand that each of the eight transducers has both the capability to transmit and receive acoustic signals. The baseline signal 1710 is delivered to environment 1630 by transducer T1 while each of the other remaining transducers T2-T8 were "listening" for the baseline. Note that each of transducers T2-T8 are placed at different positions with respect to the environment 1630 and, therefore, will experience different acoustics in response to the same baseline 1710.

Figure 17B:
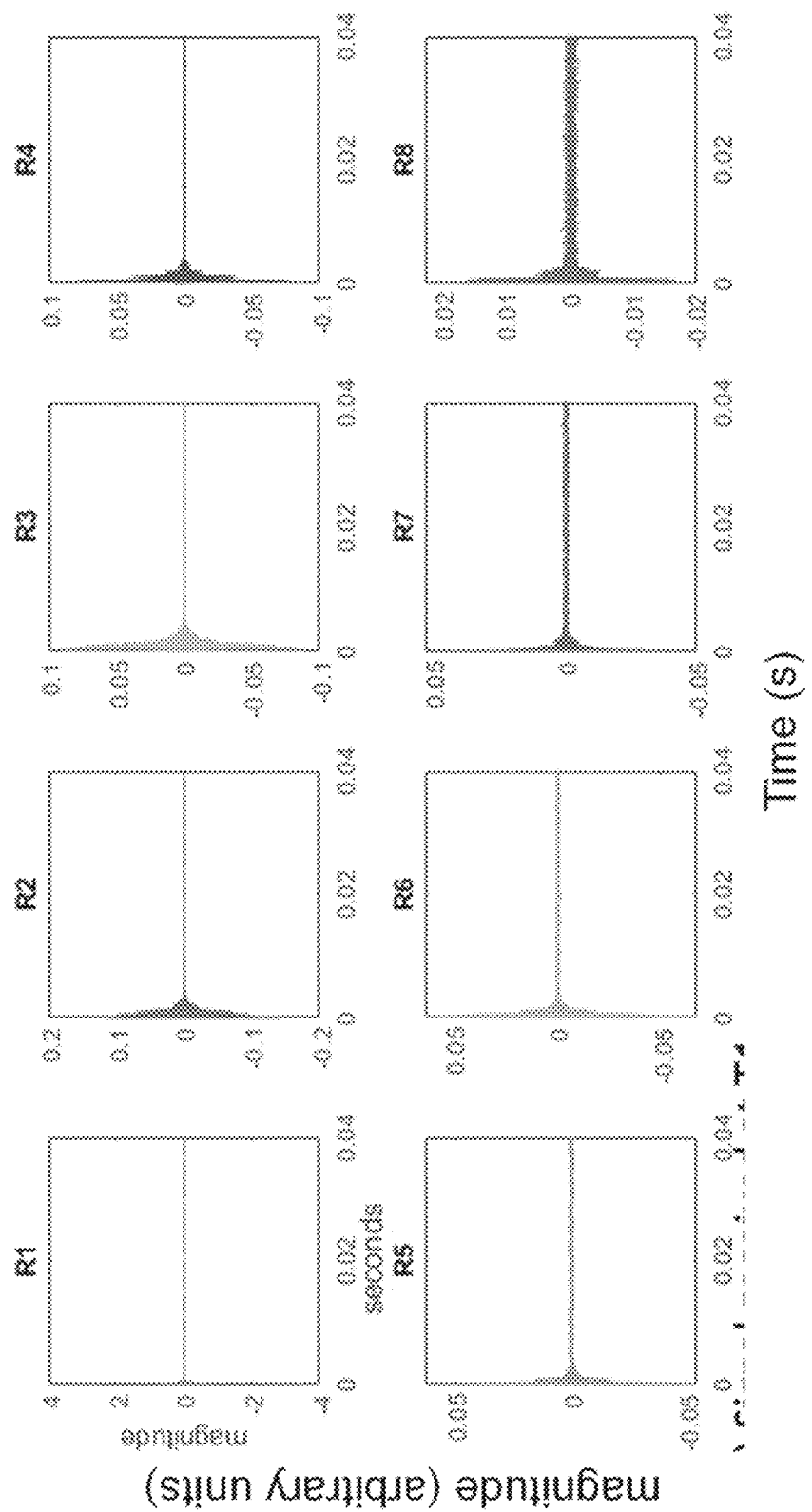
FIG. 17B shows the status of transducers R2-R8 during receipt of the baseline signal (pulse) 1710.

FIG. 17B shows the status of each of the eight transducers R1-R8 (referred to as T1-T8 in FIG. 17A) during receipt of the baseline signal (pulse) 1710 after it has interacted with the PCB 1627 in baseline configuration 1600a (FIG. 16A). One can readily see from FIG. 17B that the received signals at each transducer R2-R8 are considerably different, strongly suggesting that the differences in placement of transducers R2-R8 with respect to capacitor 1627b leads to different results. This implies the possibility for detecting spatially resolved changes in environments using differently spaced transducers. The change can be located in the environment 1630 by triangulating the magnitude of changes in these signals with the locations of the respective transducers.

Figure 17C:
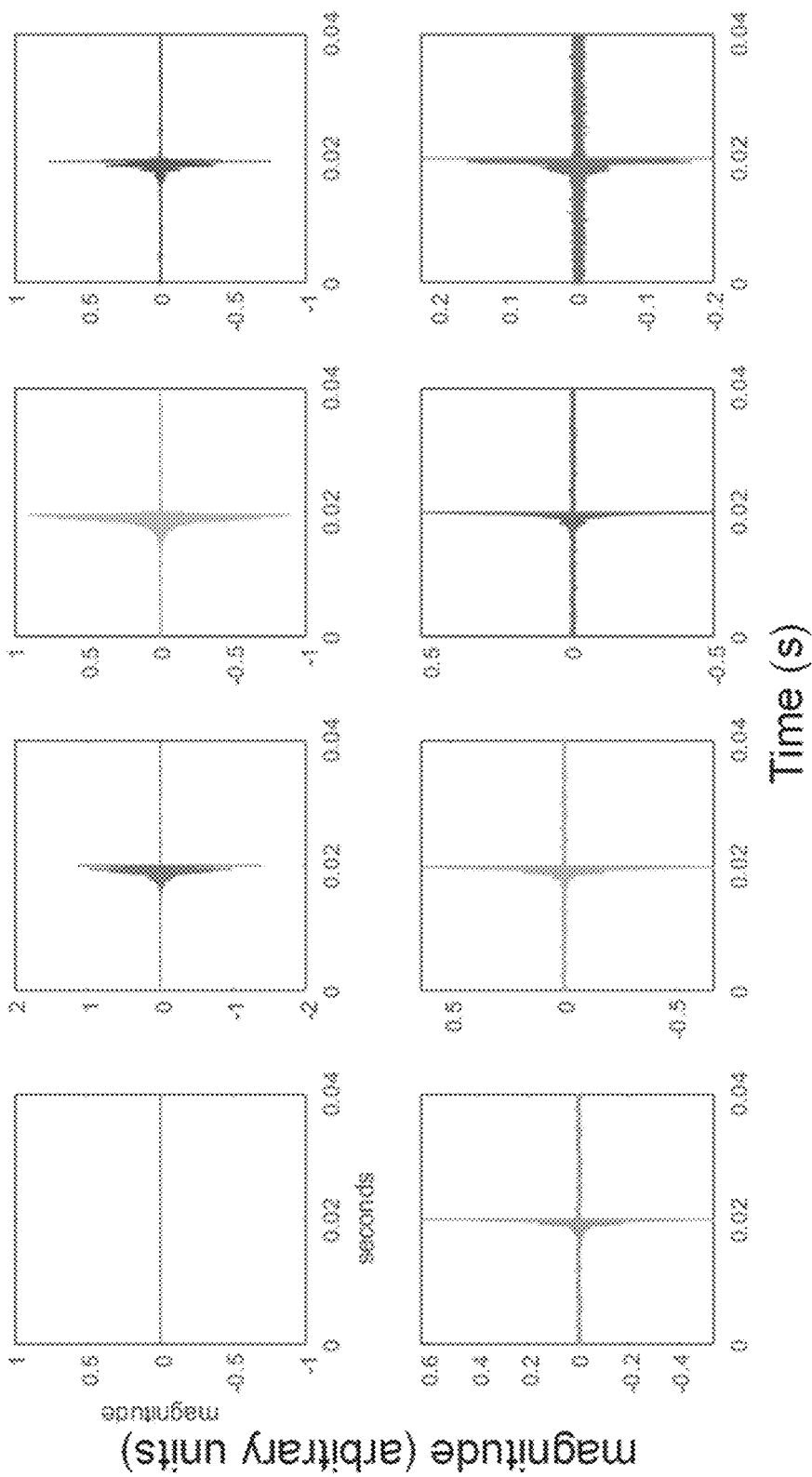
FIG. 17C shows the status of transducers R2-R8 during emanation of the test signals 1720.

FIG. 17C shows the status of each of the eight transducers R1-R8 during emanation of the test signals. Test signals are formed by time-reversing the baseline signal (pulse) 1710 shown in FIG. 17B for each transducer. Similar to FIG. 17B, FIG. 17C shows that the test signal is different for each transducer R2-R8, again emphasizing that placement of the transducers is important.

Figure 17D:
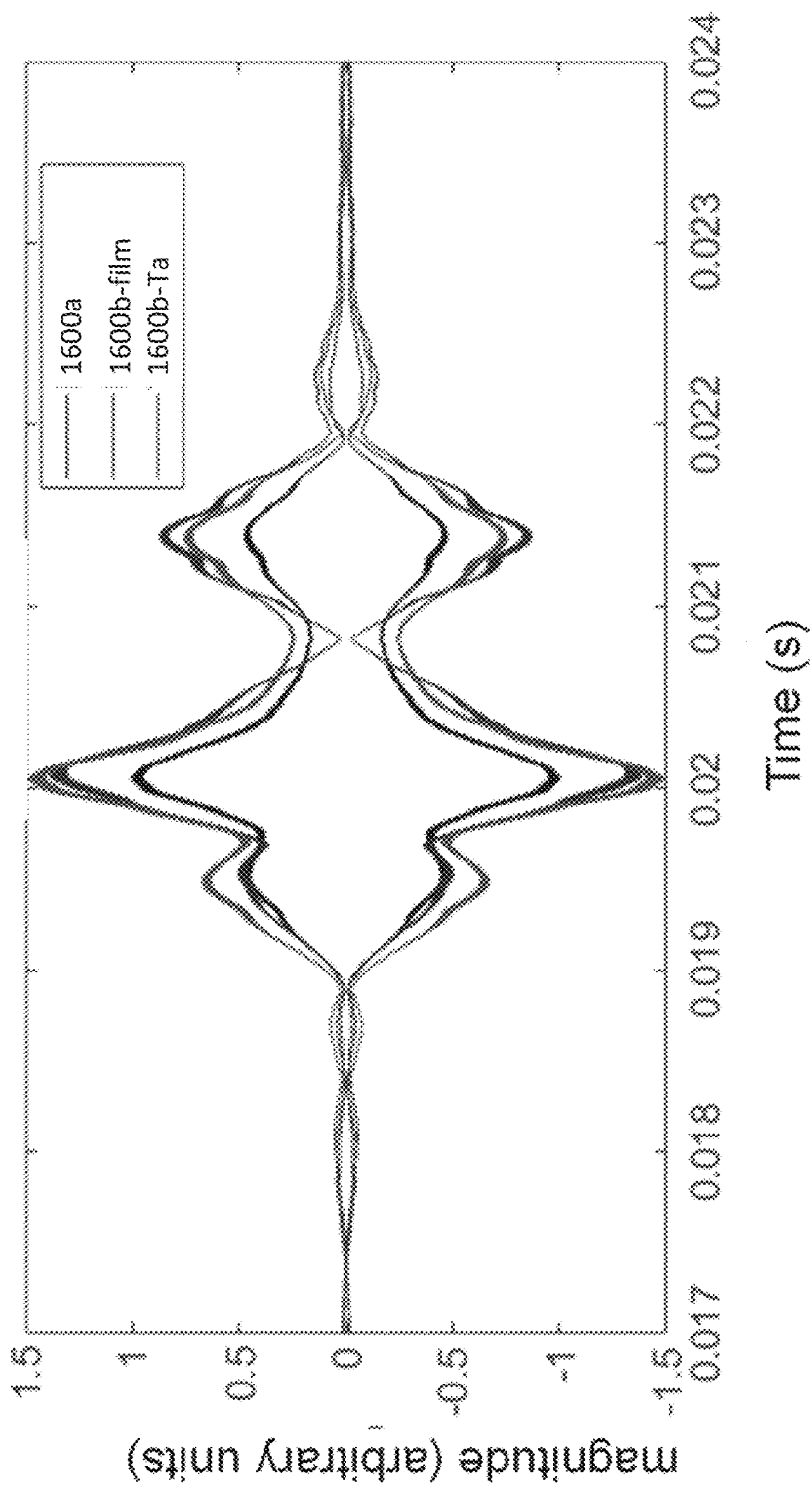
FIG. 17D shows re-constructed signals at transducer T1 as a result of transducers R2-R8 sending time-reversed, test signals 1720 of baseline pulse 1710 sent by T1 during baseline and when different capacitors are added to PCB 1627.

FIG. 17D shows the resultant re-constructed signal at transducer T1 from each transducer R2-R8 sending time-reversed, test signals of the original baseline pulse 1710 sent by T1. Three different cases are shown in FIG. 17D. The first represents the original, baseline condition of 1600a in which there is no capacitor at site 1627a on PCB 1627. The second represents condition 1600b where the added capacitor is a film capacitor ("1600b—film"). The third represents condition 1600b where the added capacitor is a tantalum capacitor ("1600b—Ta").

As shown in FIG. 17D, there is considerable difference among the received signals for the capacitors 1600b and the baseline 1600. As one might expect, the signals for the two capacitor cases 1600b are much closer in amplitude and in form than either is to the baseline 1600a. This result shows the technique can clearly distinguish between PCB 1627 with a capacitor and without.

Figure 17E:
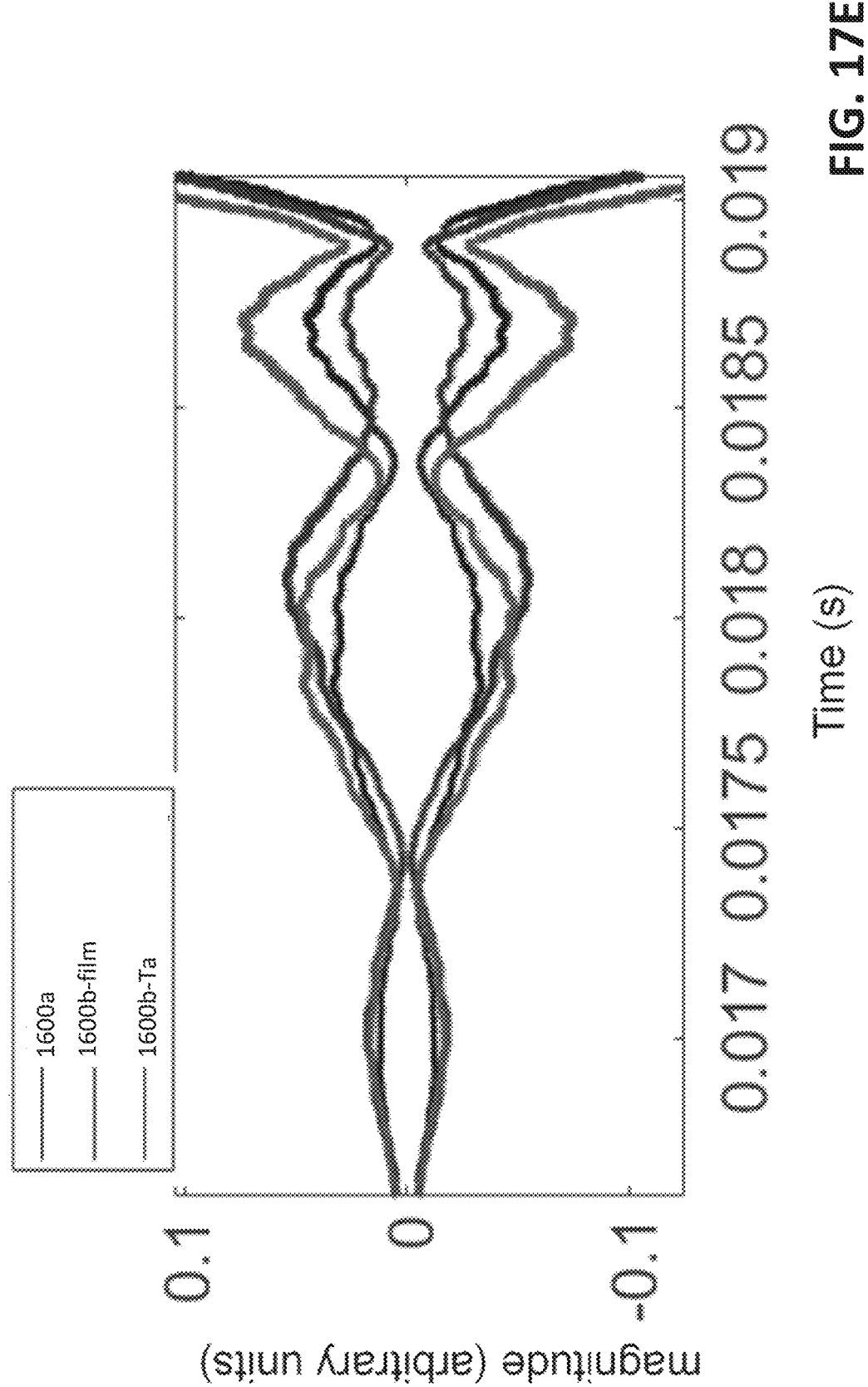
FIG. 17E is a blow-up of a side lobe region of the plot in FIG. 17D emphasizing differences in the received signals for baseline (1600a) and the two different types of capacitors (1600b).

In addition, these data also show a different signature for adding the two different types of capacitors in 1600b, in the sense that the signals at T1 for 1600b—film and 1600b—Ta vary measurably. This is highlighted in FIG. 17E, which is a blow-up of the indicated region, side lobe region, in FIG. 17D. FIG. 17E shows how differences between 1600a, 1600b—film, and 1600—Ta appear to be enhanced at the side lobe region. This suggests that the side lobe region might be a preferable part of the signal to concentrate analysis. In particular, automated detection schemes may zero in on side lobe, or other high contrast regions, to different conditions in the environment 1630.

Figure 18A:
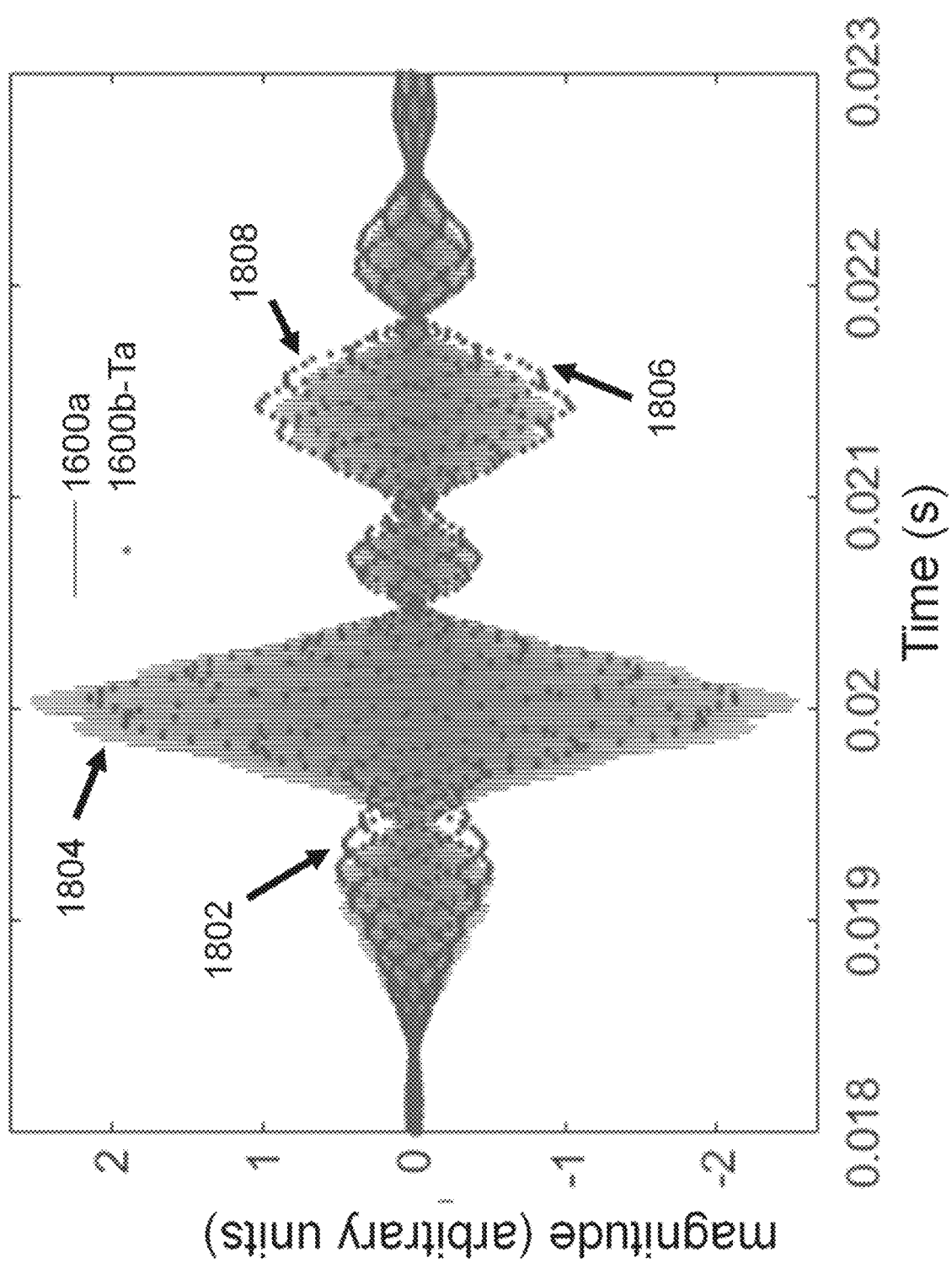
FIG. 18A compares the reconstructed signal at T1 for the baseline case (1600a) with no capacitor and the case in which a tantalum capacitor has been added (1600b—Ta).
Figure 18B:
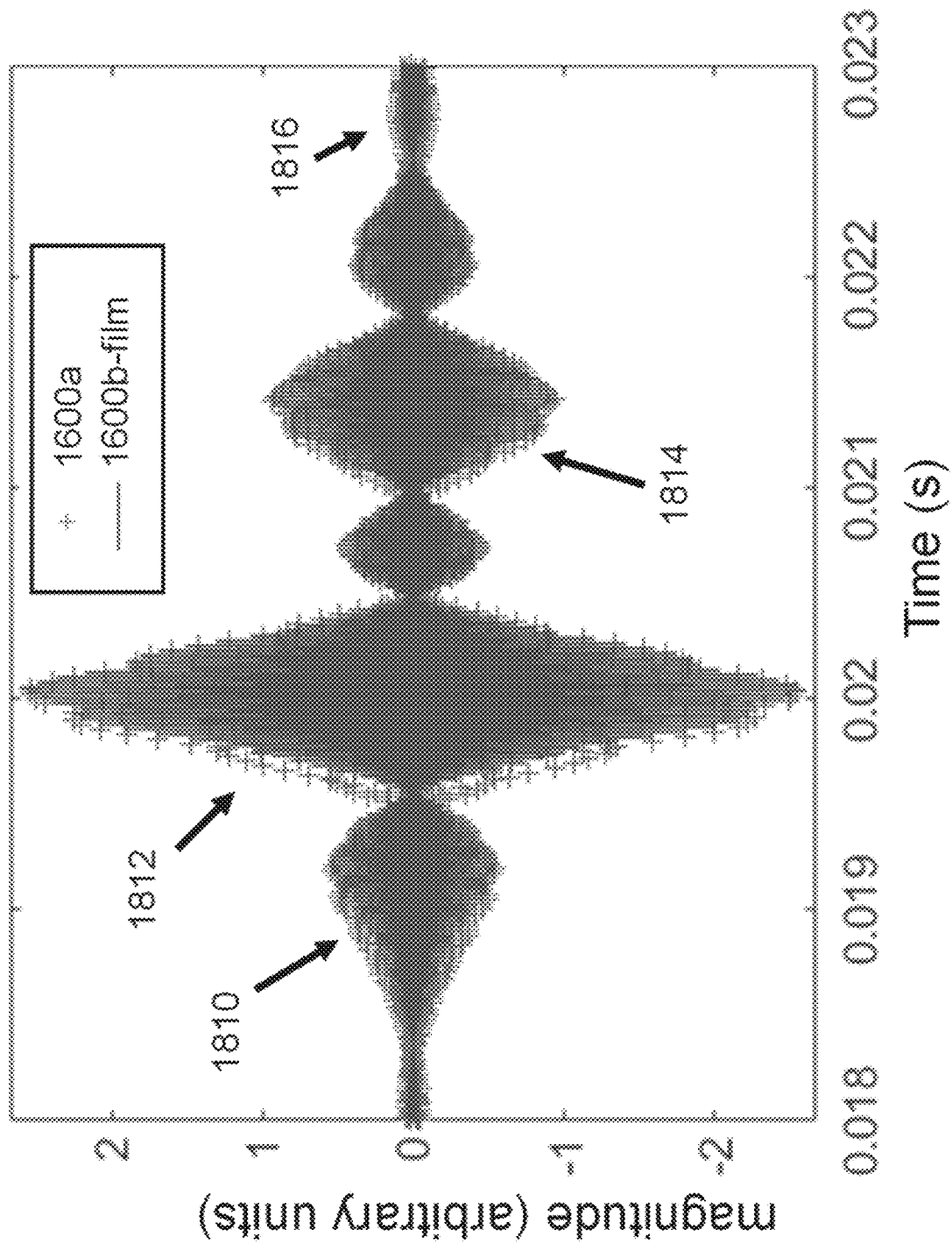
FIG. 18B shows similar disparities as in FIG. 18A for the reconstructed signal after a film capacitor is added (1600b—film) and baseline (1600a).
Figure 18C:
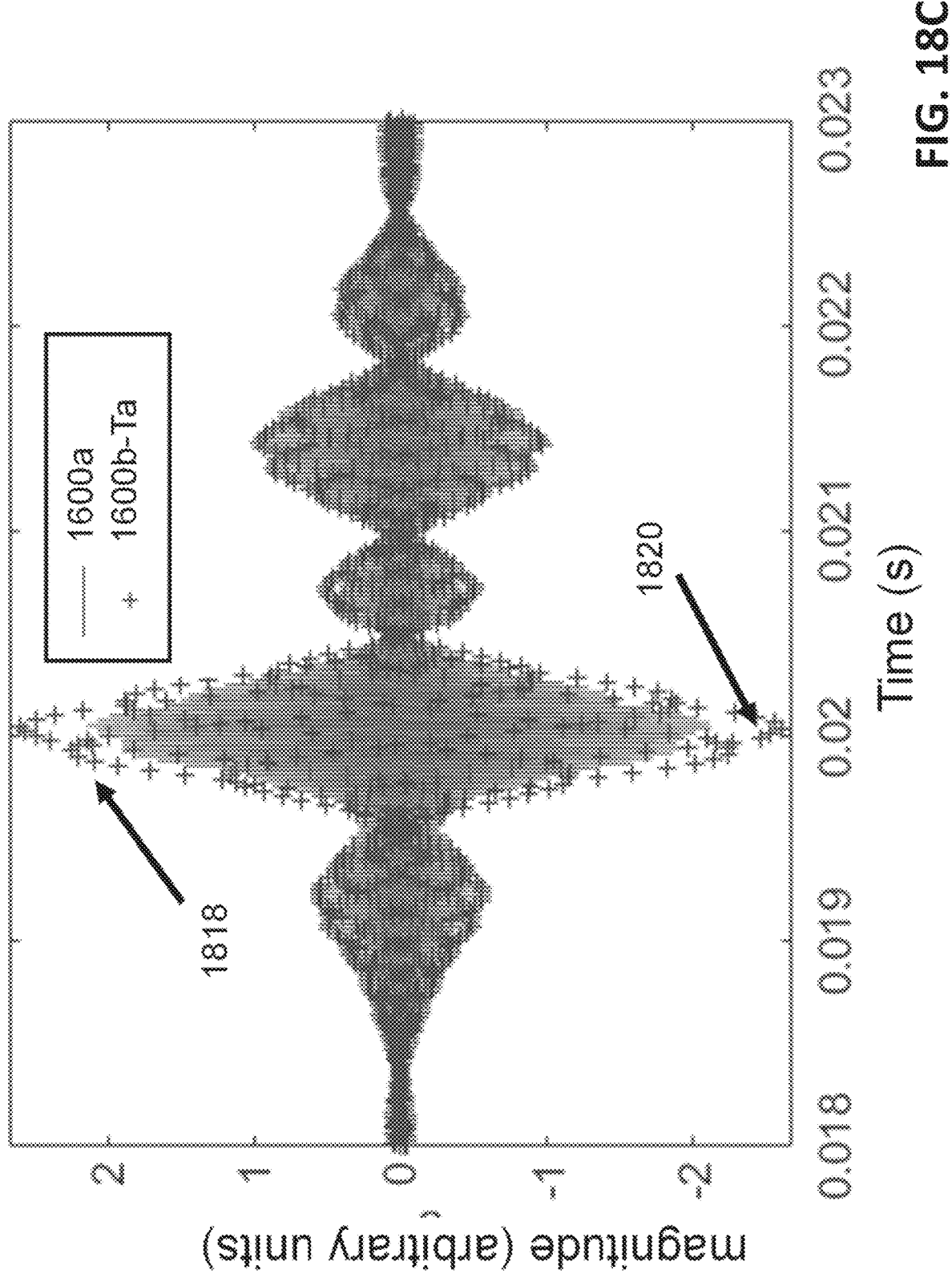
FIG. 18C compares both reconstructed signals at T1 for each different type of capacitor, showing that the acoustics distinguish the different types of capacitors even without the baseline.

FIGS. 18A-18C show individual comparisons of the reconstructed signal at T1 from each of the three cases, 1600a, 1600b—film, and 1600b—Ta. Each of them shows measurable distinctions that would be sufficient for distinguishing the modifications to PCB 1627 based on the acoustic signatures alone.

For example, FIG. 18A compares the reconstructed signal at T1 for the case baseline case 1600a (no capacitor) and the case in which a tantalum capacitor has been added (1600b—Ta). Addition of the tantalum capacitor introduces clear changes in the reconstructed signal, where the reconstructions for 1600a and 1600b—Ta deviate. These differences are particularly noticeable at 1802, 1804, 1806, and 1808. The disparities shown here readily indicate that the addition of a tantalum capacitor to PCB 1627 is a change in environment 1630 from baseline 1600a.

FIG. 18B shows similar disparities between the reconstructed signal after a film capacitor is added (1600b—film) and baseline, particularly at 1810, 1812, 1814, and 1816. FIG. 18C compares both reconstructed signals at T1 for each different type of capacitor, showing that the acoustics distinguish the different types of capacitors even without the baseline. In particular, there are large deviations at 1818 and 1820 that appear to relate to the differences in the acoustic signatures of the two different kinds of capacitors. This suggests that, if one of the capacitors were used to establish a baseline, methods described herein could detect if that capacitor were exchanged with a different capacitor. In other words, the difference in acoustic signatures of the two capacitors could detect a swop that would be hard, or maybe even impossible, to resolve using other techniques like video, etc., where the two capacitors may appear similar.

While various inventive aspects, concepts and features of the inventions may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present application may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

What is claimed is:

1. A method for detecting a change in an environment comprising:
   forming, via one or more transducers, a test acoustic signal based on time-reversal of a baseline acoustic signal after the baseline acoustic signal has traversed the environment while the environment is in a baseline condition;
   detecting, via the one or more transducers, the test acoustic signal after the test acoustic signal has traversed the environment while the environment is in an unknown condition;
   determining, via a processor, a correlation of the baseline acoustic signal with the detected test acoustic signal after the test acoustic signal has traversed the environment while the environment is in the unknown condition;
   determining, via the processor, that there has been a change in the environment by comparing the determined correlation with a correlation of the baseline acoustic signal with the detected test acoustic signal after the test acoustic signal has traversed the environment while the environment is in the baseline condition; and
   outputting, via the processor, an indication that there has been a change in the environment upon determining that there has been a change in the environment.

2. The method of claim 1, wherein:
   the baseline acoustic signal is transmitted by a first one of the one or more transducers; and
   the test acoustic signal is detected by the one or more transducers after the test acoustic signal has traversed the environment while the environment is in the unknown condition.

3. The method of claim 2, wherein:
   the test acoustic signal is transmitted by a second transducer of the one or more transducers; and
   the baseline acoustic signal is detected by the second transducer after the baseline acoustic signal has traversed the environment while the environment is in a baseline condition.

4. The method of claim 1, wherein the determining that there has been a change in the environment comprises comparing the detected test acoustic signal after the test acoustic signal has traversed the environment while the environment is in the unknown condition with a detected test acoustic signal after the test acoustic signal has traversed the environment while the environment is in the baseline condition.

5. The method of claim 1, further comprising determining that there has been a change in the environment when the determined correlation is lower than the correlation of the baseline acoustic signal with a detected test acoustic signal after the test acoustic signal has traversed the environment while the environment is in the baseline condition.

6. The method of claim 5, further comprising determining that there has been a change in the environment when the determined correlation is lower than half of the correlation of the baseline acoustic signal with a detected test acoustic signal after the test acoustic signal has traversed the environment while the environment is in the baseline condition.

7. The method of claim 1, further comprising forming the test acoustic signal, wherein forming the test acoustic signal comprises:
   transmitting the baseline acoustic signal;
   detecting the transmitted baseline acoustic signal after the baseline acoustic signal has traversed the environment while the environment is in the baseline condition; and
   time-reversing the detected baseline acoustic signal to form the test acoustic signal.

8. The method of claim 7, wherein:
   the baseline acoustic signal is transmitted by a first transducer of the one or more transducers;
   the test acoustic signal is detected by the first transducer after the test acoustic signal has traversed the environment while the environment is in an unknown condition;
   the test acoustic signal is transmitted by a second transducer of the one or more transducers; and
   the baseline acoustic signal is detected by the second transducer after the baseline acoustic signal has traversed the environment while the environment is in a baseline condition.

9. The method of claim 1 further comprising:
   generating multiple test acoustic signals with at least four transducers of the one or more transducers; and
   wherein determining that there has been a change in the environment comprises determining correlations of the baseline acoustic signal with the multiple test acoustic signals.

10. The method of claim 9, wherein determining correlations of the baseline acoustic signal with the multiple test acoustic signals improves a resolution of determining that there has been a change in the environment over determining correlations of the baseline acoustic signal with a single test acoustic signal.

11. The method of claim 9, further comprising determining a location where a change in the environment has occurred.

12. The method of claim 1, wherein the environment comprises at least one of a room, a shipping container, a vault, a nuclear fuel storage facility, a weapons storage facility, a storage facility for high value items, an area storing sensitive documents, a circuit board, or a computer.

13. The method of claim 1, wherein the change in the environment comprises at least one of a security breach, tampering with equipment, removal of an object from the environment, placement of an object in the environment, placement of a listening device in the environment, and unauthorized retrieval of information stored in the environment.

14. The method of claim 1, wherein a frequency of the baseline acoustic signal is 40 kHz or more.

15. The method of claim 14, wherein the frequency of the baseline acoustic signal is different than a frequency of ambient noise in the environment.

16. The method of claim 1, further comprising detecting changes in the environment at a size scale that is less than a wavelength of the baseline acoustic signal.

17. A method for detecting a change in an environment comprising:
   forming, via one or more transducers, multiple test acoustic signals based on time-reversal of a baseline acoustic signal after the baseline acoustic signal has traversed the environment while the environment is in a baseline condition;

detecting, via the one or more transducers, the multiple test acoustic signals after the multiple test acoustic signals have traversed the environment while the environment is in an unknown condition;

determining, via a processor, a correlation of the baseline acoustic signal with the detected multiple test acoustic signals after the multiple test acoustic signals have traversed the environment while the environment is in the unknown condition;

determining, via the processor, that there has been a change in the environment by comparing the determined correlation with a correlation of the baseline acoustic signal with the detected multiple test acoustic signals after the multiple test acoustic signals have traversed the environment while the environment is in the baseline condition; and outputting, via the processor, an indication that there has been a change in the environment in response to determining that there has been a change in the environment.

18. A system comprising:

at least two transducers;

at least one processor associated with the at least two transducers;

a storage medium associated with the at least one processor, the storage medium storing instructions executable by the processor to:

form, via the at least two transducers, a test acoustic signal based on time-reversal of a baseline acoustic signal after the baseline acoustic signal has traversed the environment while the environment is in a baseline condition;

detect, via the at least two transducers, the test acoustic signal after the test acoustic signal has traversed the environment while the environment is in an unknown condition;

determine a correlation of the baseline acoustic signal with the detected test acoustic signal after the test acoustic signal has traversed the environment while the environment is in the unknown condition;

determine that there has been a change in the environment by comparing the determined correlation with a correlation of the baseline acoustic signal with the detected test acoustic signal after the test acoustic signal has traversed the environment while the environment is in the baseline condition; and output an indication that there has been a change in the environment upon determining that there has been a change in the environment.

\* \* \* \* \*